United States Patent
Reed et al.

(10) Patent No.: US 8,151,281 B2
(45) Date of Patent: Apr. 3, 2012

(54) METHOD AND SYSTEM OF MAPPING AT LEAST ONE WEB SERVICE TO AT LEAST ONE OSGI SERVICE

(75) Inventors: Benjamin C. Reed, Morgan Hill, CA (US); Ted J. Bonkenburg, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 2020 days.

(21) Appl. No.: 10/754,145

(22) Filed: Jan. 9, 2004

(65) Prior Publication Data
US 2005/0154785 A1    Jul. 14, 2005

(51) Int. Cl.
*G06F 3/00* (2006.01)
(52) U.S. Cl. .......................... 719/328; 719/330
(58) Field of Classification Search .................. 719/310, 719/328, 330; 707/1; 709/223
See application file for complete search history.

(56) References Cited

U.S. PATENT DOCUMENTS

| 7,398,305 | B2 * | 7/2008 | Bodin et al. | 709/222 |
| 2003/0061067 | A1 * | 3/2003 | Atwal et al. | 705/1 |
| 2003/0220993 | A1 * | 11/2003 | Blizniak et al. | 709/223 |
| 2004/0015564 | A1 * | 1/2004 | Williams | 709/219 |
| 2004/0044656 | A1 * | 3/2004 | Cheenath | 707/3 |
| 2004/0054690 | A1 * | 3/2004 | Hillerbrand et al. | 707/104.1 |
| 2005/0038708 | A1 * | 2/2005 | Wu | 705/26 |

OTHER PUBLICATIONS

The Lucent, Consistent, Yet Anonymous, Web Access with LPWA, 1999.*

* cited by examiner

*Primary Examiner* — Lechi Truong

(57) ABSTRACT

The present invention provides a method and system of mapping. In an exemplary embodiment, the method and system include (1) creating a proxy bundle corresponding to the at least one web service, (2) registering a proxy web service corresponding to the proxy bundle in a service registry, (3) searching for the at least one web service in the service registry, (4) returning a reference to the proxy web service from the service registry in response to the searching, and (5) invoking at least one method on the returned reference, thereby invoking the at least one web service.

2 Claims, 21 Drawing Sheets

METHOD AND SYSTEM OF MAPPING AT LEAST ONE WEB SERVICE TO AT LEAST ONE OSGI SERVICE

FIELD OF THE INVENTION

The present invention relates to web services and local services, and particularly relates to a method and system of mapping at least one web service to at least one OSGi service and exposing at least one local service as at least one web service.

BACKGROUND OF THE INVENTION

Web services is a key on demand technology and is a standard way to interact with remote services. Technology exists to enable clients to invoke remote services as if they were local services. Furthermore, applications can implement web services as easily as writing routines for normal Java methods.

However, there is a problem with the prior art policy of allowing (1) which remote service to use and (2) when to use it, being determined by a client. In addition, applications must conform to the service activation model of the web service hosting application to implement web services. These hosting applications bring with them their own management and configuration issues as well as a large footprint.

OSGi

Open Service Gateway Initiative (hereinafter "OSGi") is a framework that allows applications to be decoupled from the services they use. Policy decisions of which services are made available and when they are made available can be done outside of the application. OSGi provides a Java platform, Java™ API for XML-based Remote Procedure Call (JAX-RPC), for managing functional units, called bundles, that can be dynamically added and removed at runtime. The platform also manages interaction between bundles using a service registry that enables a bundle to explicitly register objects to be shared with other bundles. Together, the bundle management and service registry provide a powerful environment for managing the interaction of bundles and services. The goal of OSGi is to "create open specifications for the network delivery of managed services to local networks and devices."

Figure 1:
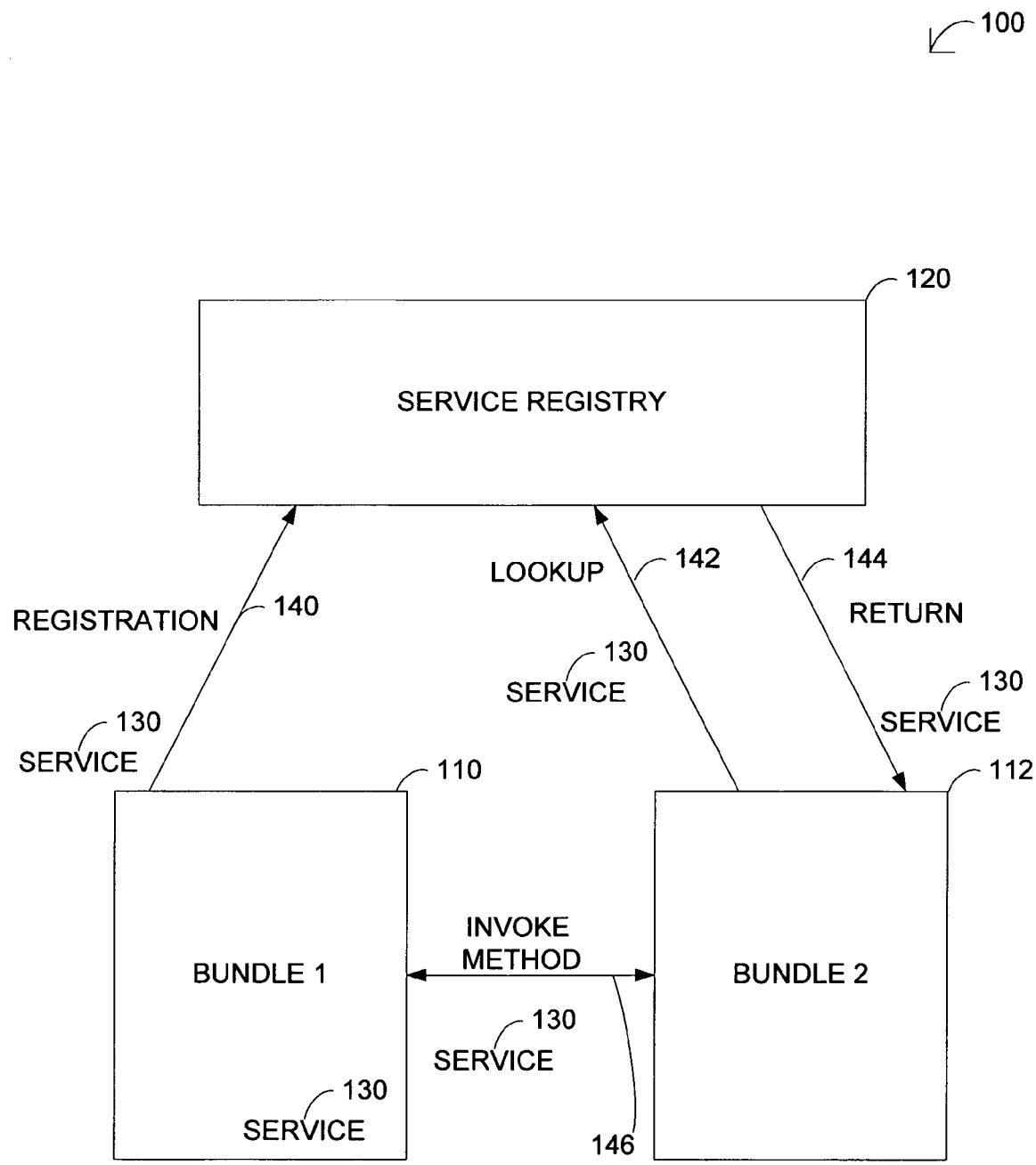

Prior art FIG. 1 shows an example of two bundles 110 and 112 interacting through a services registry 120. In the example, bundle 110 is a bundle that registers a service, svc, 130, via a registration 140. The service will be registered under one of the interfaces it implements and, optionally, additional properties that describe service 130.

Once service 130 has been registered, bundle 112 can query service registry 120 to find service 130 via a query, or a lookup, 142. Service registry 120 will return a reference to service 130, via a return 144. Therefore, bundle 112 can invoke methods on service 130, via an invoke 146, just as it can invoke methods on any other object.

Bundles

Functionality is added to an OSGi framework in the form of bundles, such as bundles 110 and 112. A bundle is a collection, usually in the form of a JAR file, of classes and resources. A bundle is started by instantiating an activator class, specified in the bundle's manifest, and invoking a start( ) method on the instantiated object.

In theory a bundle may have all the classes it needs to run. In other words, OSGi does provide a way to import all shared classes. However, in practice, a bundle will need to share objects with another bundle. When this sharing is done, the two bundles will need a shared class so that they can both interact with the shared object without getting a ClassCastException.

In order to enable class sharing, bundles explicitly define which packages they export (share) and import (use) in their manifest. The framework ensures that the imports and exports are resolved correctly. If the exporter of a package changes, perhaps because it was updated or uninstalled, any importers will be re-resolved and thus restarted or stopped if no exporters remain.

Once a bundle as been started it may provide some functionality directly to a user or device using its own classes, it may need services provided by another bundle, or it may just provide services to other bundles.

Bundles can use in web service runtime (a) either web service stubs (b) or dynamic invocation interfaces. However, the OSGi service registry, such as service registry 120, provides a decoupling of the services being used from the users of the service. Service registry 120 provides a way to change the web service used by a bundle, such as bundle 112, without changing a bundle's code or its configuration. It allows a bundle, such as bundle 112, to use a local implementation of the web service, such as web service 235, without any code changes even if it was written to use a web service through service registry 120.

OSGi Service

An OSGi service is an object that is registered by a bundle providing the service in a service registry. In general an OSGi service is registered using the name of an interface implemented by the object and a list of properties describing the service. This allows a clean decoupling of the interfaces used by bundles in their interaction from the implementation of those interfaces.

Service Registry

The OSGi platform also provides a service registry, such as service registry 120, to allow components to interact through defined objects, which is another feature missing from Java. Bundles can find registered services by querying the service registry. If a bundle has registered a service listener with the framework, the bundle will also be notified when services get added to or removed from the service registry.

Stopping a Bundle

When a bundle is stopped, the framework will invoke the stop( ) method on the activator object, unregister any services the bundle has registered, and release any services being used.

Permissions

OSGi also uses Java permissions. Each bundle is assigned a set of permissions. These permissions are checked by the OSGi framework when it interacts with the service registry. Bundles also use permission checks when providing services to other bundles.

Security in OSGi

OSGi provides authentication security via a UserManager service. UserManager service is a standard service in OSGi that maps a user id in to the groups that user belongs to and a set of public and private information.

OSGi provides authorization security by using Java permissions to authorize requests made by bundles. The framework uses a ServicePermission to restrict which bundles can access a service, and the services themselves have service specific permissions to restrict what other bundles can do.

Pluggable Functionality

The OSGi platform enables the dynamic management of pluggable functionality, a feature that has been highly touted but not fully realized by Java (e.g. of Sun Microsystems, Inc.).

in general. Pluggable functionality is implemented using Java components that can be updated and removed at runtime without restarting the JVM.

Problems with OSGi

OSGi has certain problems. For example, OSGi only handles local services which are services running in the same runtime. Specifically, OSGi only addresses the interaction of services running locally, inside the platform and does not address the interaction of services running between platforms. In other words, OSGi does nothing to provide access to services that are provided by components outside of the Java runtime. In addition, using OSGi to register all services from a single bundle leads to the problem of if any of the imported packages became unresolved, then (1) the bundle would stop and (2) all proxies would be unregistered.

Web Services

On the other hand, web services specifically addresses how remote services interact. Web services is emerging as a standard way to provide services that can be invoked by remote clients. The standards are being set up to allow various platforms and applications written in diverse languages to interact.

JAX-RPC

For example, the Java JAX-RPC specification (hereinafter "JAX-RPC") already provides a mapping between web services and the Java platform. Specifically, the JAX-RPC specification defines a standard way of using web services. This mapping allows a Java client to use web services without worrying about which platform that service is implemented on or which language the service is written in. In other words, in Java, each web service is represented by an interface. A type of JAX-RPC is an embedded version of JAX-RPC called JSR172.

Implementations of JAX-RPC provide the ability to create classes from WSDL that will (a) implement the interface defined by the web service and (b) do the necessary work to communicate with the server providing the web service. This proxying can even be done dynamically by creating the object that implements the interface at run time.

Type of Web Services

The term web services is used very loosely. In a context, web services mean web services that are compliant with JAX-RPC, a mapping of Java interfaces to Web Service Description Language (WSDL) and its corresponding Simple Object Access Protocol (SOAP) messaging. In short, JAX-RPC is a standard way of invoking web services using Java interfaces. It defines standards for mapping primitive classes to standard web service types. It also defines the serialization of non primitive types.

WSDL File

The definition of a web service is given by a WSDL file. This file contains the definition of non-primitive classes used by the service, the interface and methods provided by the service, and the Uniform Resource Locater (URL) to be used to invoke the service.

Problems with Web Services

Web services have several problems.

Limitations in JAX-RPC

For example, web services suffer from limitations in JAX-RPC. Specifically, JAX-RPC is limited in the types of interfaces that can be mapped to JAX-RPC. For example, with JAX-RPC, remote references are not allowed such that an object that is passed to or returned from a method must be serializable. In other words, objects that are used for callbacks or have methods that cannot be evaluated locally, such as InputStream.read( ), cannot be used.

In addition, with JAX-RPC, complex types must be "bean like" such that all objects sent and returned must be able to be queried to get the values needed for serialization. "Bean like" means a complex type has a default constructor and standard ways of setting and getting its members. Further, when a method returns, the returned values must be able to be instantiated.

Imperfect Mappings

In addition, web services suffer from imperfect mappings. For example, the mapping of WSDL to Java classes is not a perfect 1:1 mapping. The JAX-RPC specification doesn't have a standard way of mapping WSDL names to Java packages. Specifically, the recommendation in JAX-RPC maps an unlimited number of WSDL names to the same package. In other words, there is not a 1:1 mapping between Java classes and WSDL.

Different Implementations of Complex Types

In addition, complex types can also have many different implementations in Java, where different implementations may not be compatible.

Therefore, a method and system of mapping at least one web service to at least one OSGi service and exposing at least one local service as at least one web service is needed.

SUMMARY OF THE INVENTION

The present invention provides a method and system of mapping at least one web service to at least one OSGi service and exposing at least one local service as at least one web service. In an exemplary embodiment, the method and system of mapping at least one web service to at least one OSGi service include (1) creating a proxy bundle corresponding to the at least one web service, (2) registering a proxy web service corresponding to the proxy bundle in a service registry, (3) searching for the at least one web service in the service registry, (4) returning a reference to the proxy web service from the service registry in response to the searching, and (5) invoking at least one method on the returned reference, thereby invoking the at least one web service.

In an exemplary embodiment, the creating includes (a) retrieving WSDL of the at least one web service and (b) parsing the retrieved WSDL to get a list of packages used by the at least one web service. In a further embodiment, the creating includes saving the retrieved WSDL in a JAR file. In a particular embodiment, the saving includes storing the list of packages in a bundle manifest corresponding to the proxy bundle. In a further embodiment, the creating includes optimally generating class files that correspond to the WSDL rather than using existing class files. In an exemplary embodiment, the registering includes using a list of properties from the proxy bundle as service properties.

The present invention also provides a method and system of exposing at least one local service as at least one web service. In an exemplary embodiment, the method and system include (1) receiving a call for the at least one web service, where the call comprises a request and a response, (2) delegating the call to a client bundle, (3) obtaining the at least one local service from a service registry via the client bundle, (4) invoking at least one method on the at least one local service via the client bundle, and (5) returning a response from the invoked method for the at least one web service.

In an exemplary embodiment, the receiving includes (a) identifying a client that sent the call and (b) checking if at least one client bundle for the client exists. In a particular embodiment, the identifying includes using HTTP basic authentication.

In an exemplary embodiment, the delegating includes creating a client bundle that is not persistent and that does not register services for other bundles to use. In an exemplary embodiment, the delegating includes identifying a client that sent the call by a user id that the client is using to make the request. In an exemplary embodiment, the creating includes registering a web service client service in a service registry. In a particular embodiment, the registering includes using the web service client service to route the request to the client bundle.

In an exemplary embodiment, the obtaining includes organizing services in namespaces of the form /ws/sid/$sid, wherein $sid comprises a sid of an exposed service. In an exemplary embodiment, the delegating includes, if at least one client bundle for the client exists, forwarding the request to a web service client service registered by the at least one client bundle. In an exemplary embodiment, the delegating includes, if at least one client bundle for the client does not exist, (a) instantiating a client bundle for the client and (b) forwarding the request when the instantiated client bundle registers a web service client service in a service registry.

In an exemplary embodiment, the invoking includes using a class loader of the at least one local service to instantiate and reflect on all classes referenced by the at least one local service. In an exemplary embodiment, the creating includes (i) creating a union of all permissions that correspond to a client and groups to which the client belongs and (ii) adding the union to a permission administration service for the client bundle.

The present invention also provides a computer program product usable with a programmable computer having readable program code embodied therein of mapping at least one web service to at least one OSGi service. In an exemplary embodiment, the computer program product includes (1) computer readable code for creating a proxy bundle corresponding to the at least one web service, (2) computer readable code for registering a proxy web service corresponding to the proxy bundle in a service registry, (3) computer readable code for searching for the at least one web service in the service registry, (4) computer readable code for returning a reference to the proxy web service from the service registry in response to the searching, and (5) computer readable code for invoking at least one method on the returned reference, thereby invoking the at least one web service.

The present invention also provides a computer program product usable with a programmable computer having readable program code embodied therein of exposing at least one local service as at least one web service. In an exemplary embodiment, the computer program product includes (1) computer readable code for receiving a call for the at least one web service, where the call comprises a request and a response, (2) computer readable code for delegating the call to a client bundle, (3) computer readable code for obtaining the at least one local service from a service registry via the client bundle, (4) computer readable code for invoking at least one method on the at least one local service via the client bundle, and (5) computer readable code for returning a response from the invoked method for the at least one web service.

THE FIGURES

Figure 2:
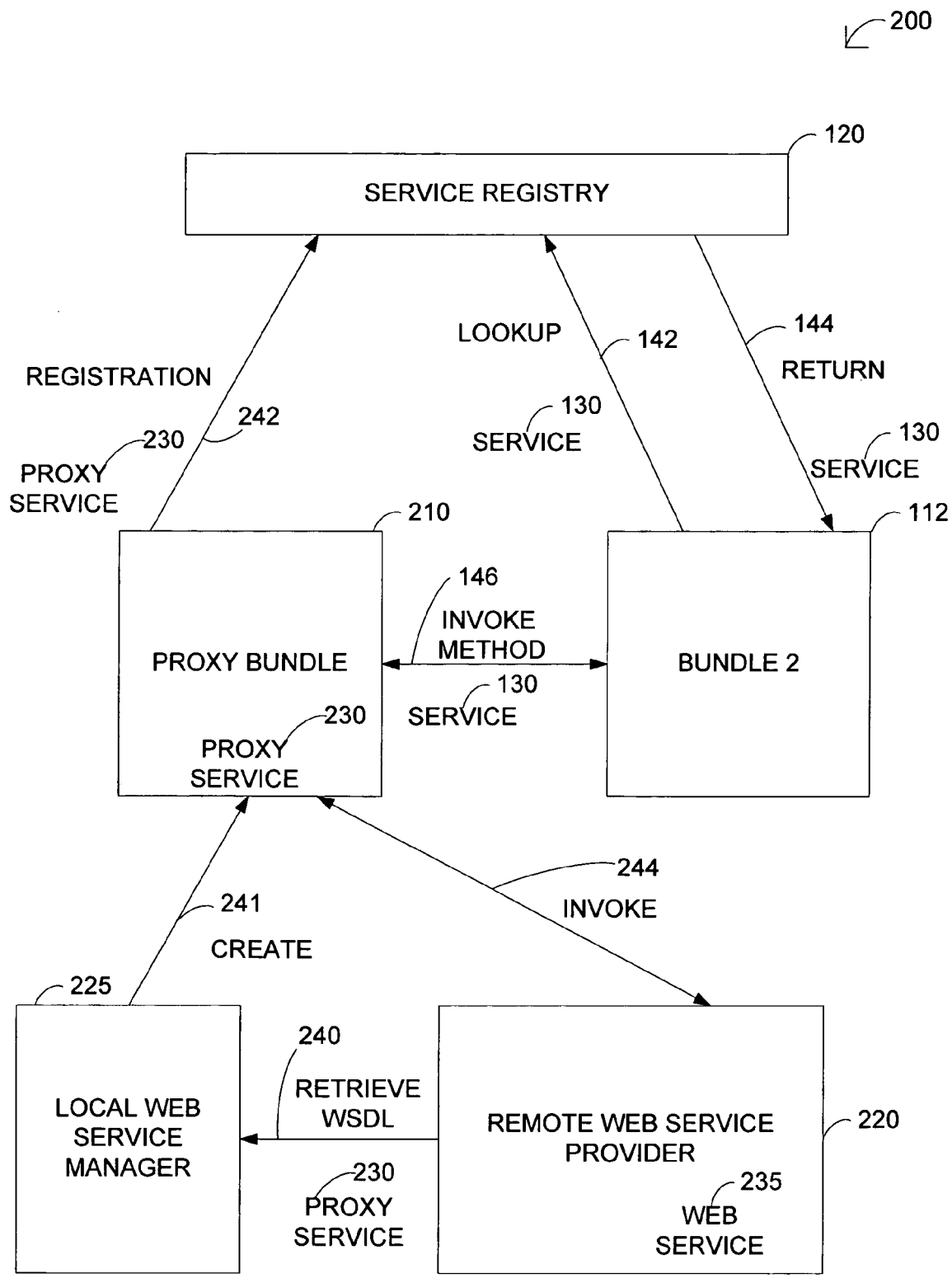
Figure 3A:
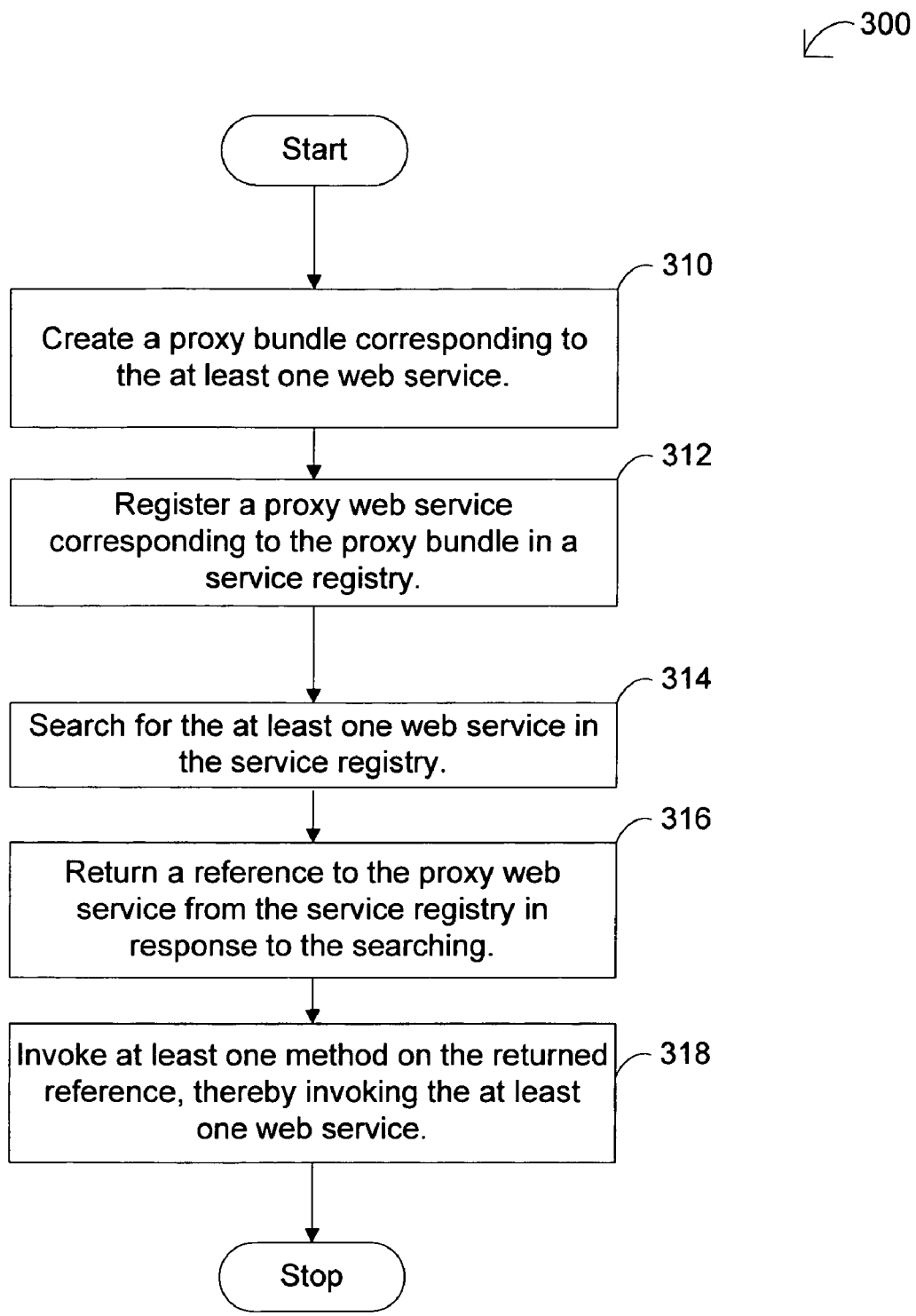
Figure 3B:
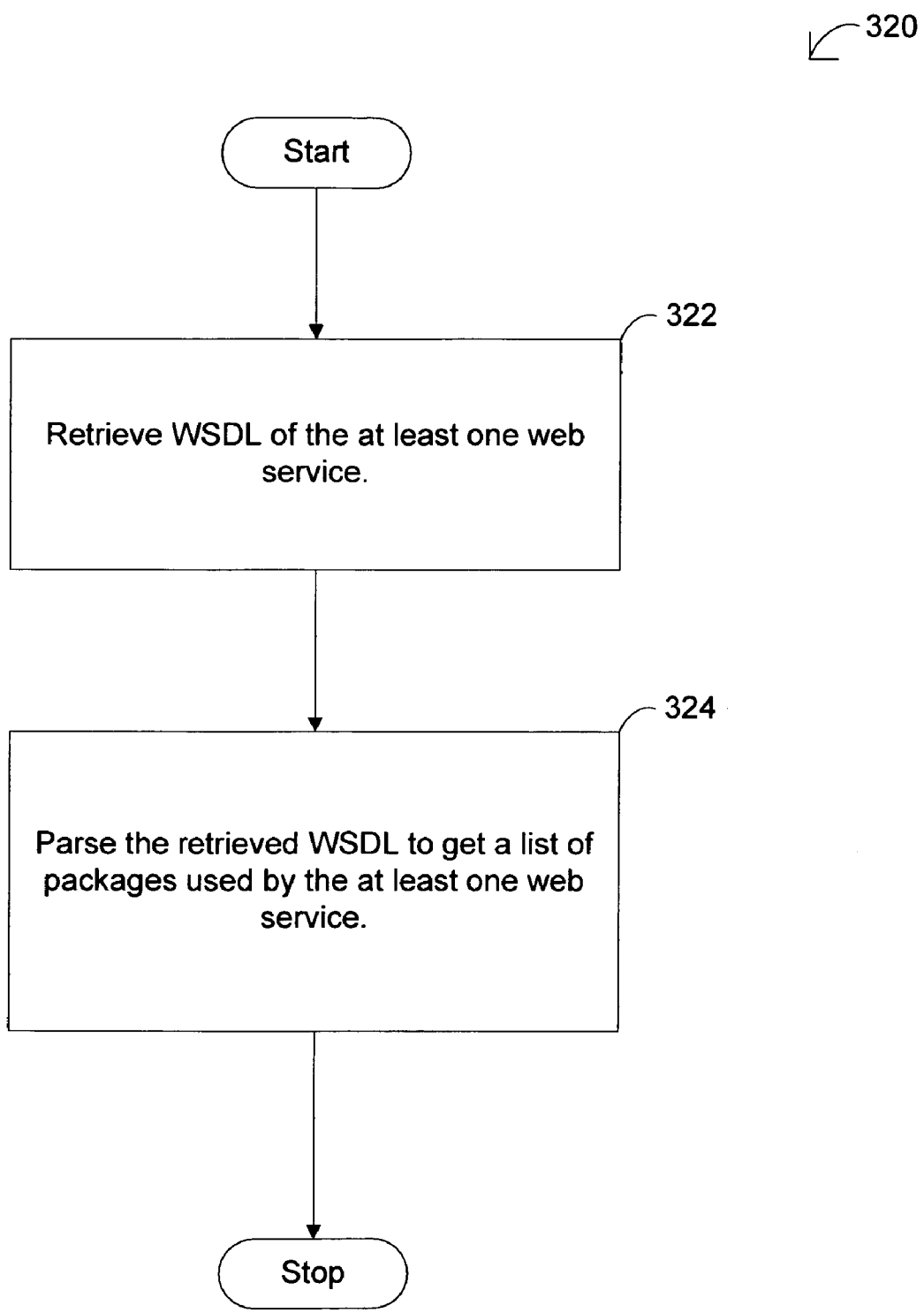
Figure 3C:
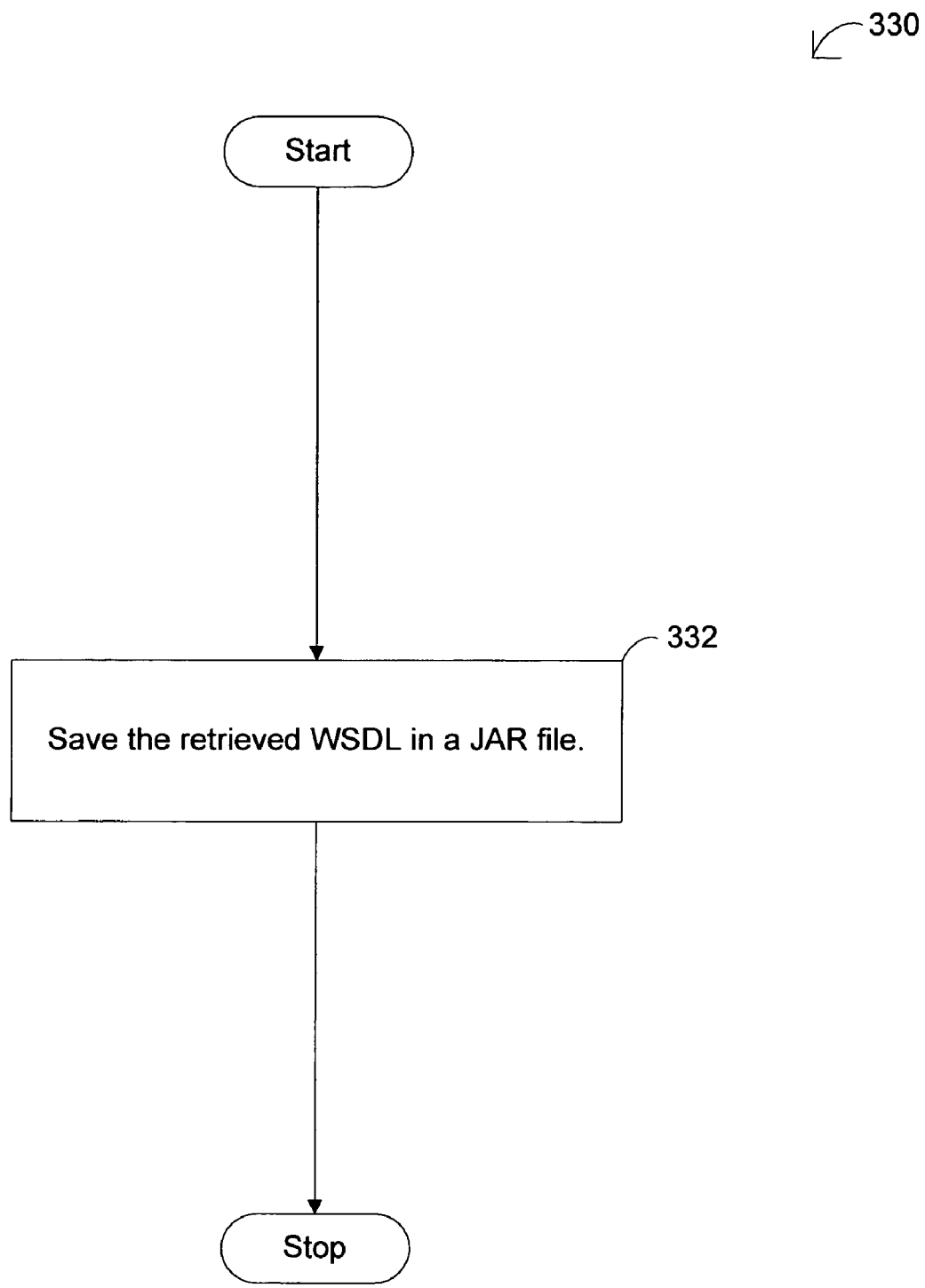
Figure 3D:
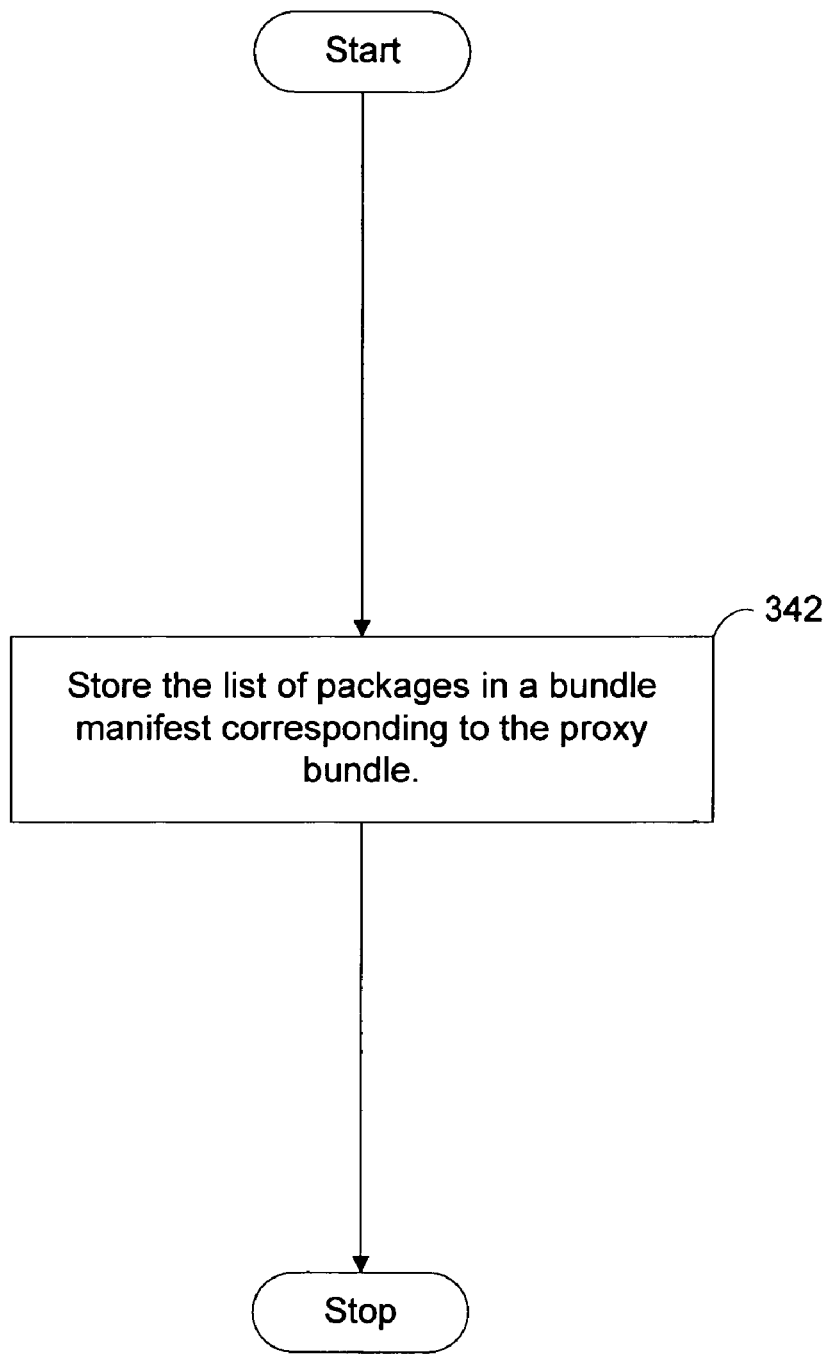
Figure 3E:
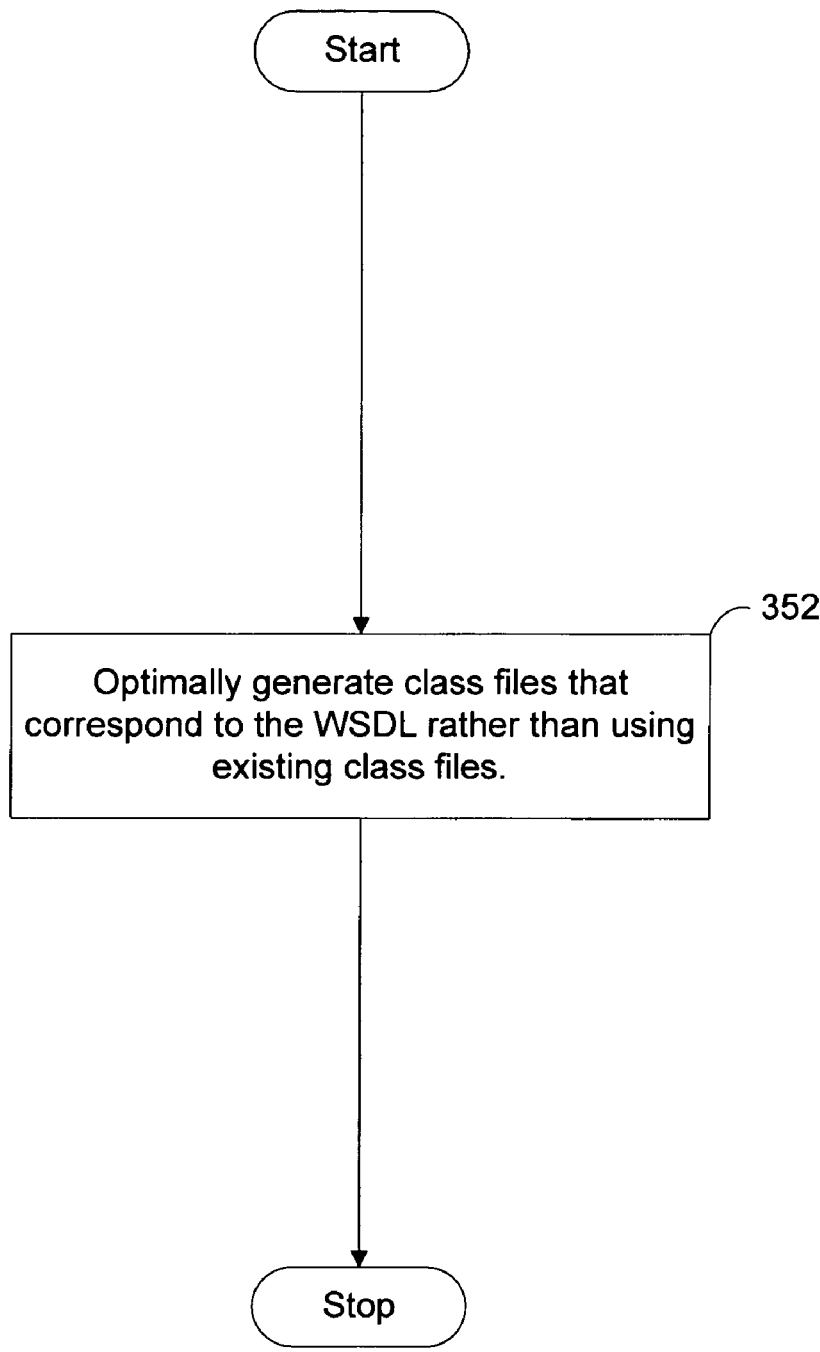
Figure 3F:
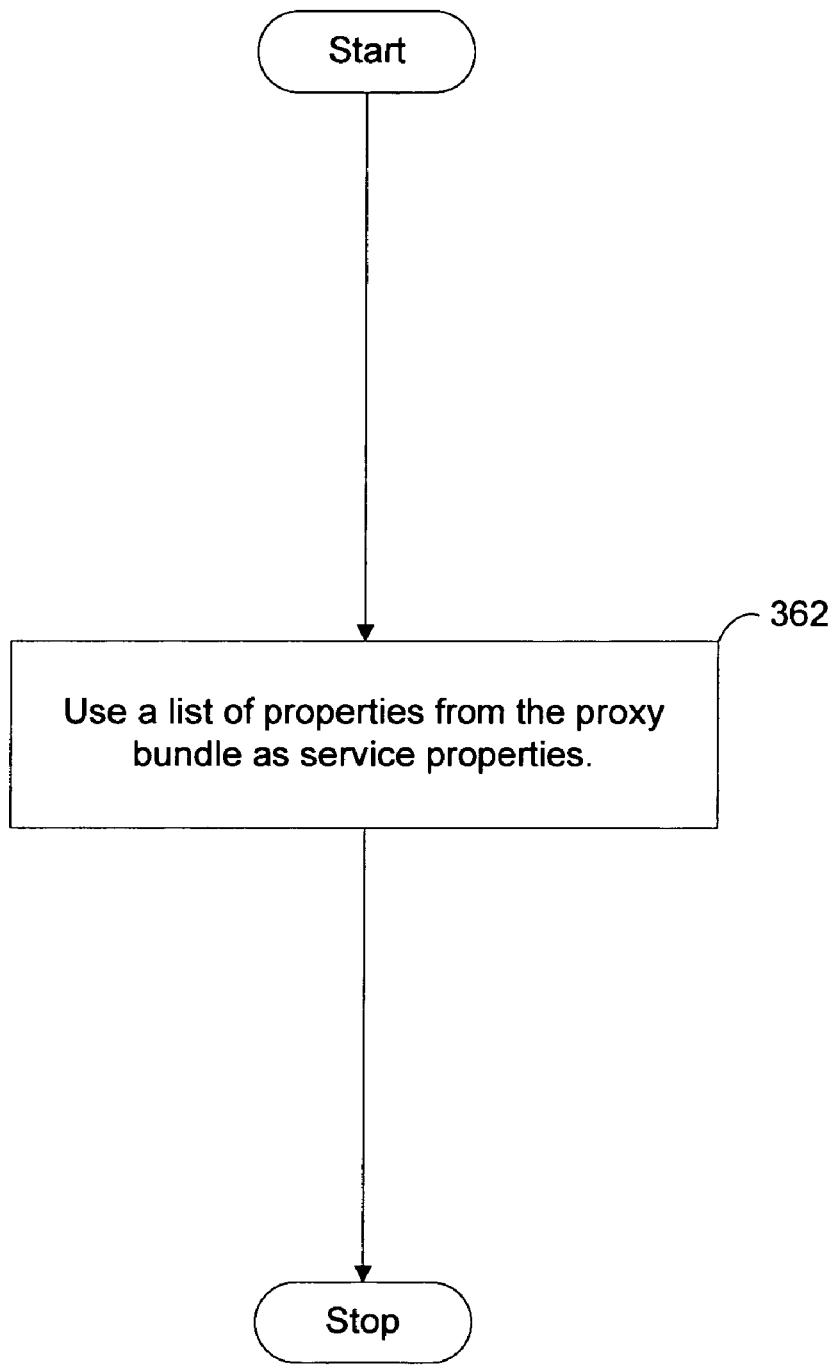
Figure 4:
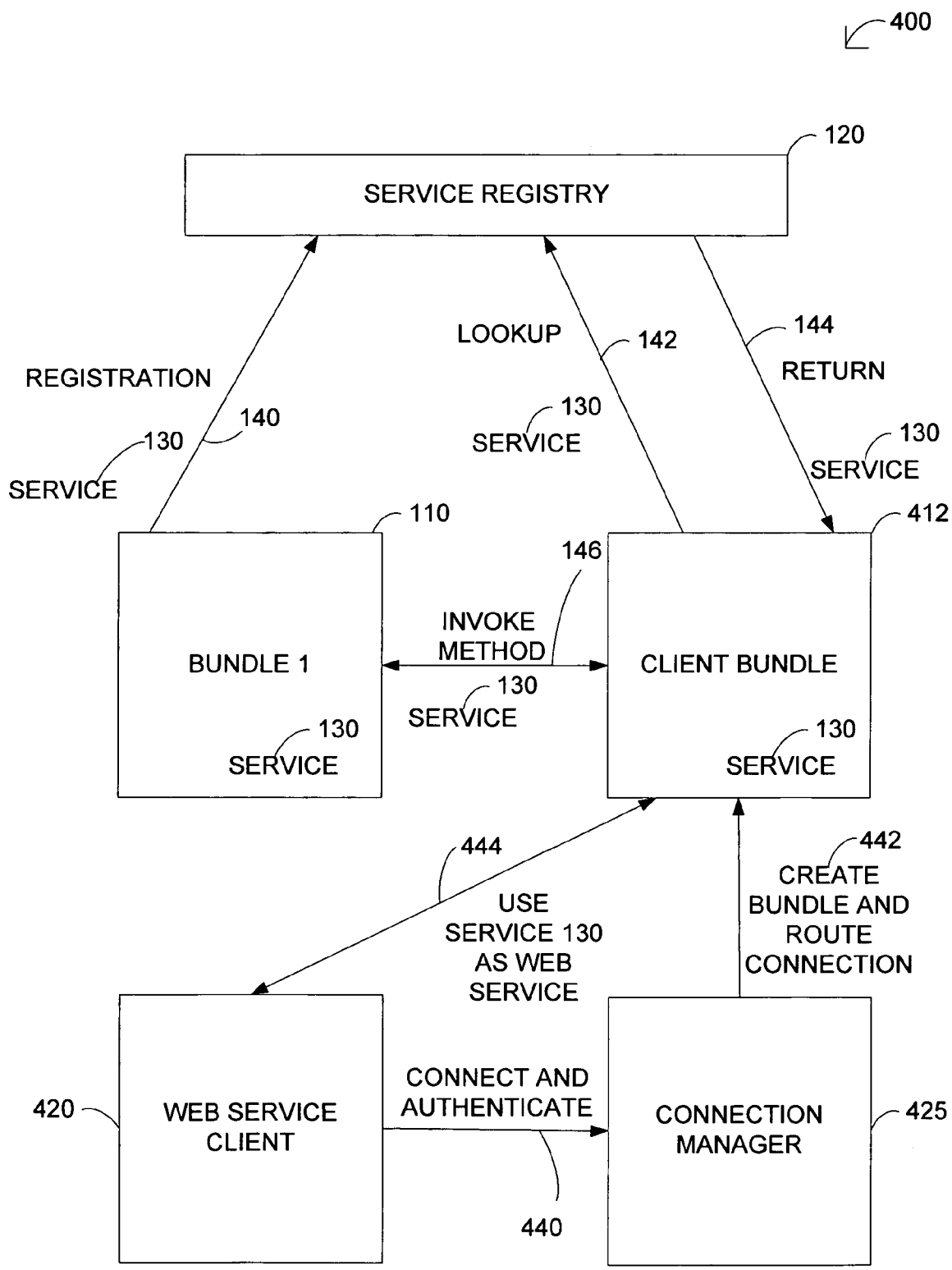
Figure 5A:
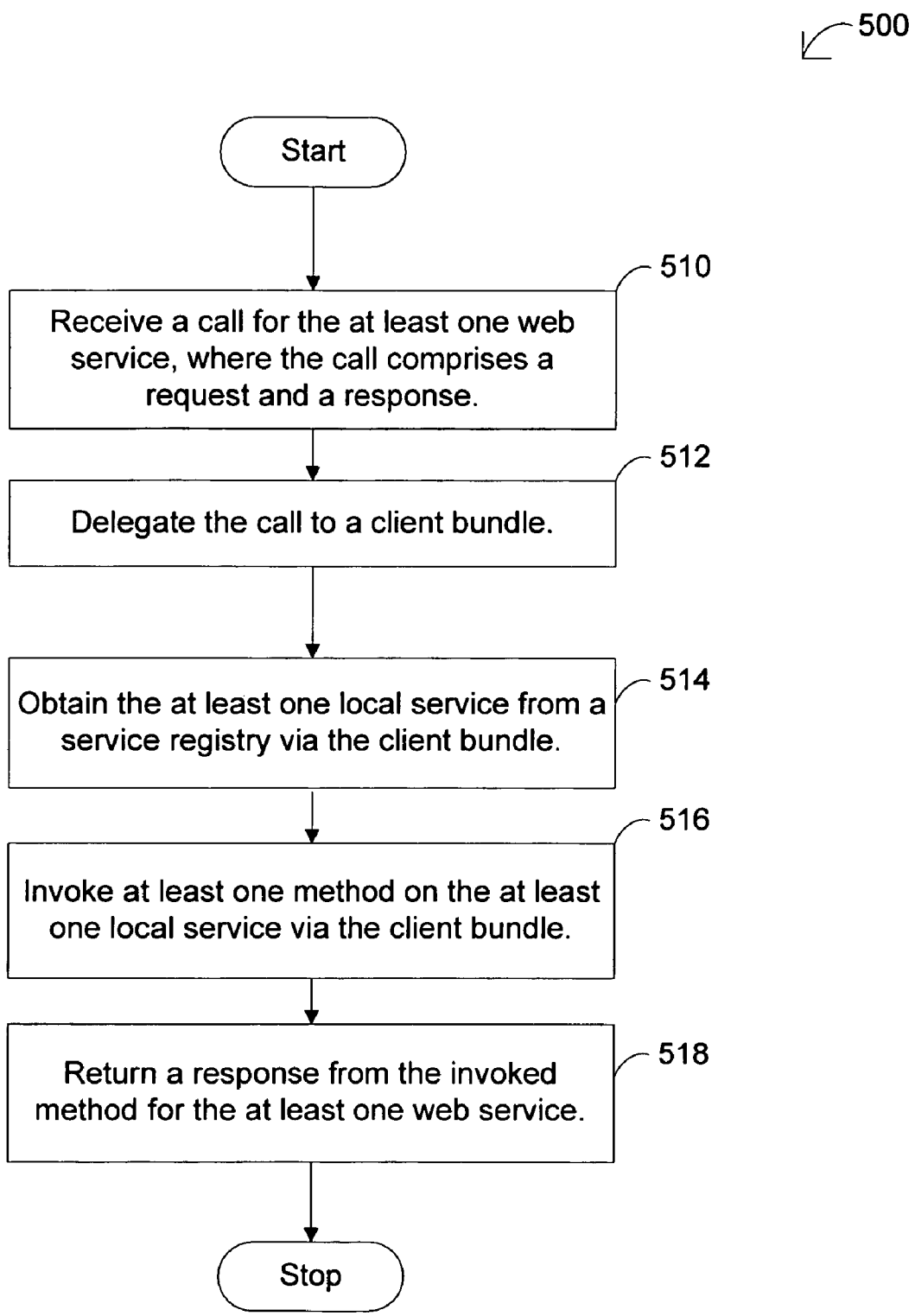
Figure 5B:
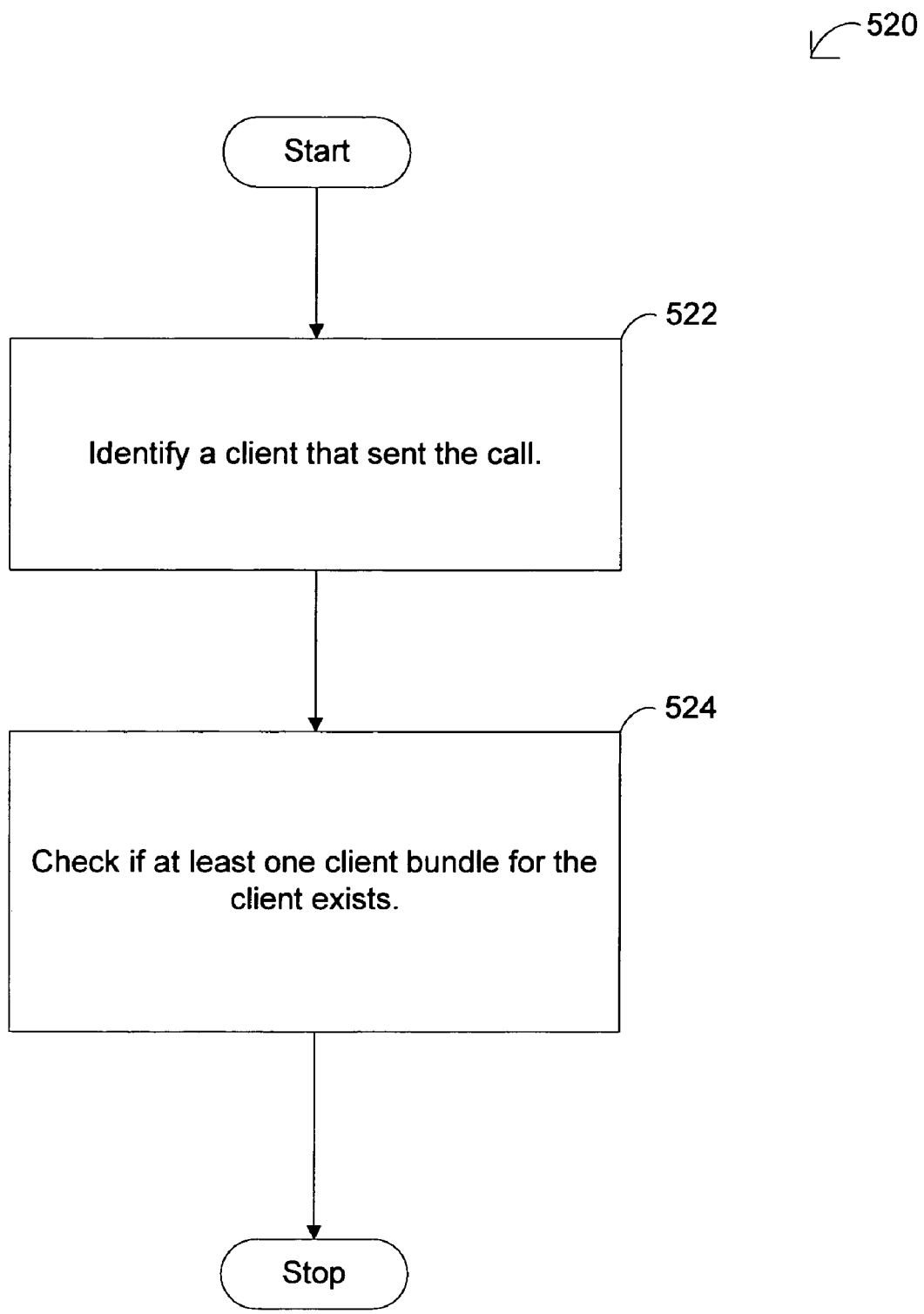
Figure 5C:
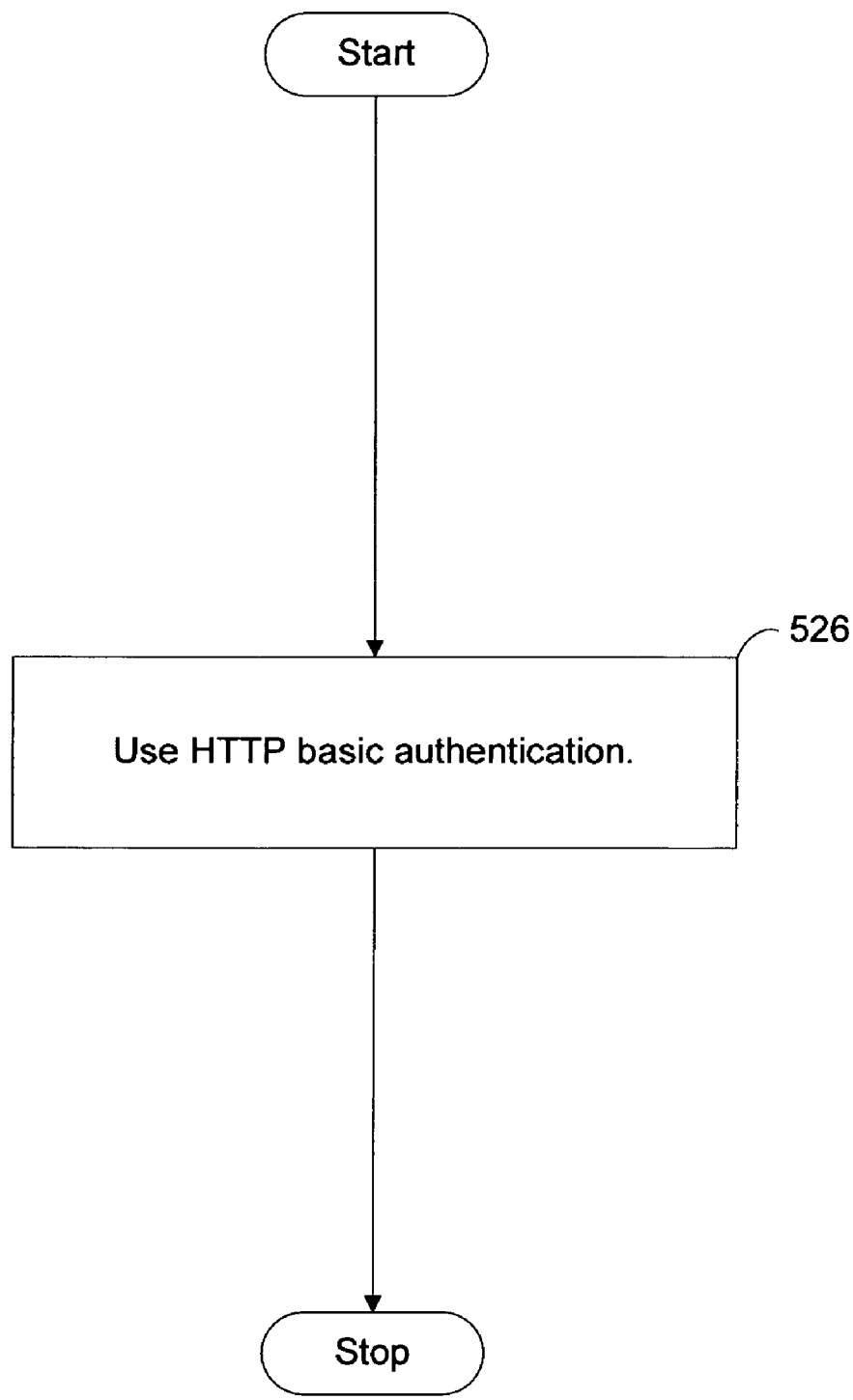
Figure 5D:
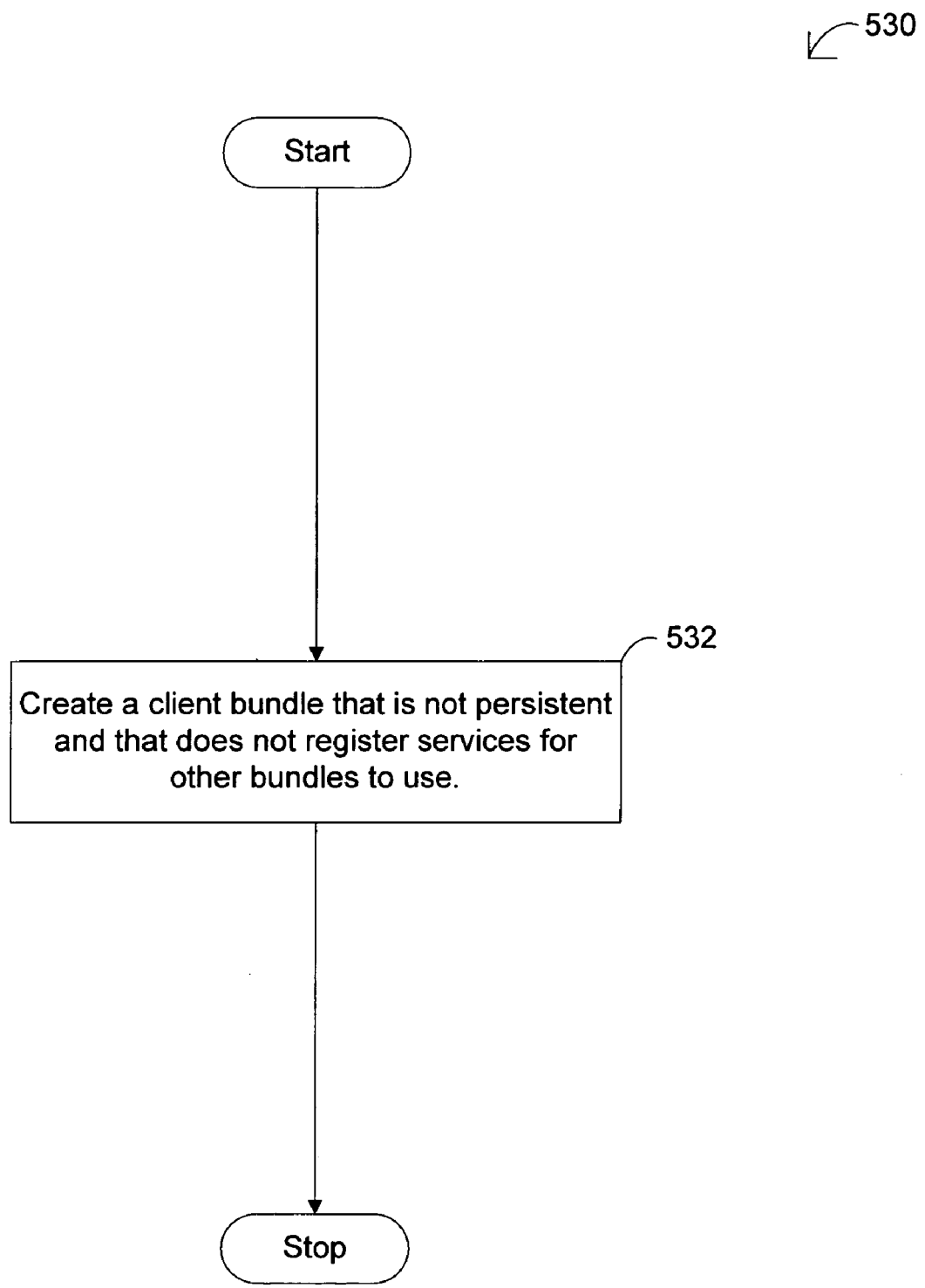
Figure 5E:
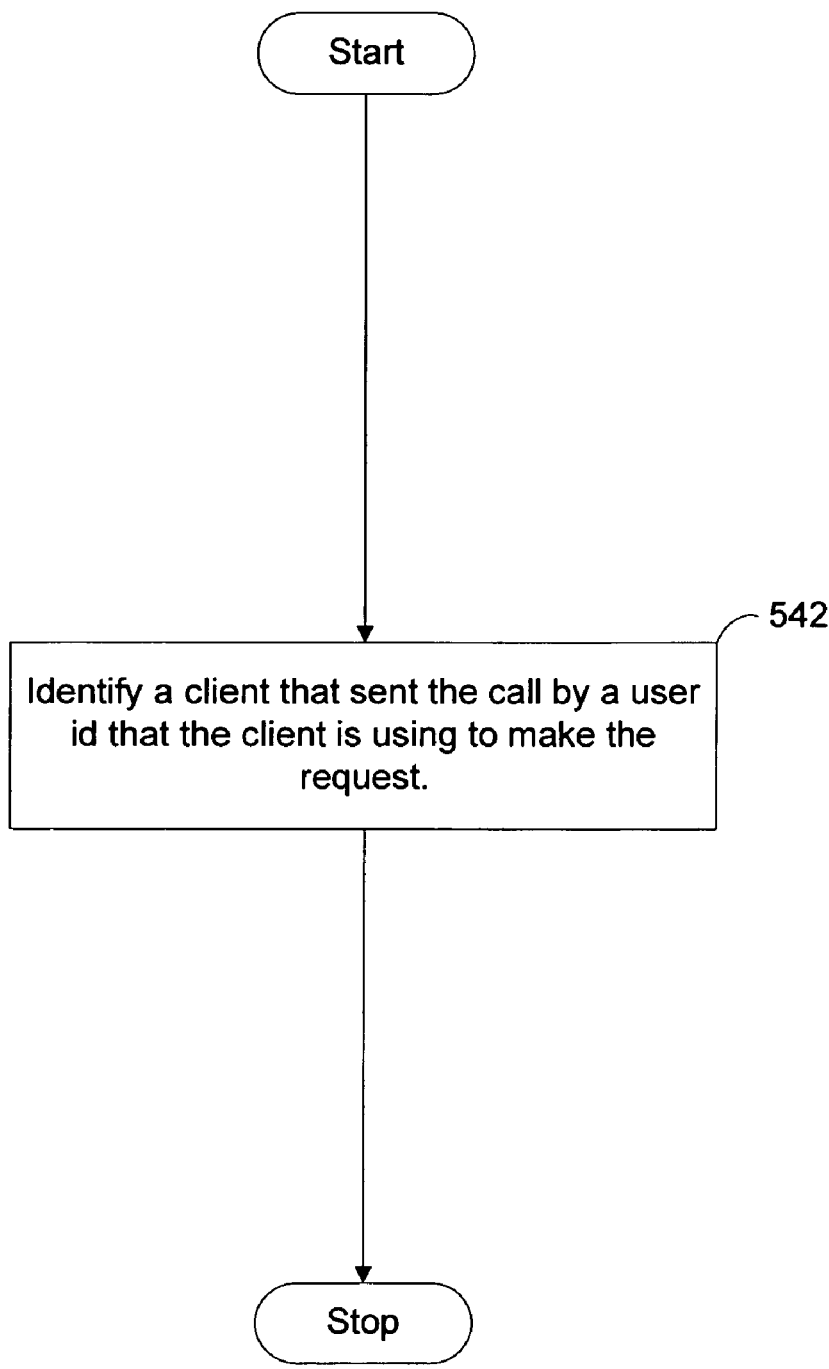
Figure 5F:
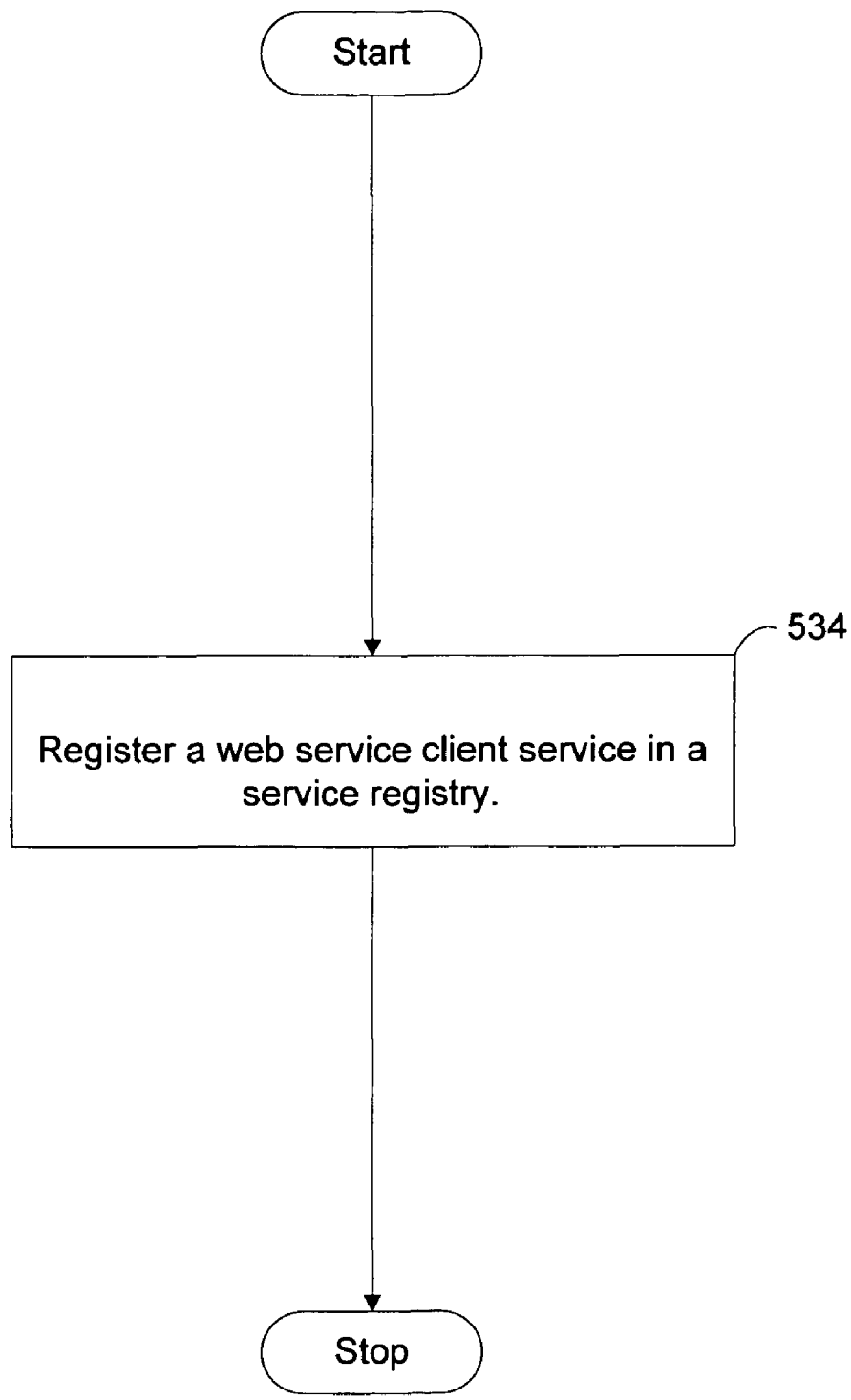
Figure 5G:
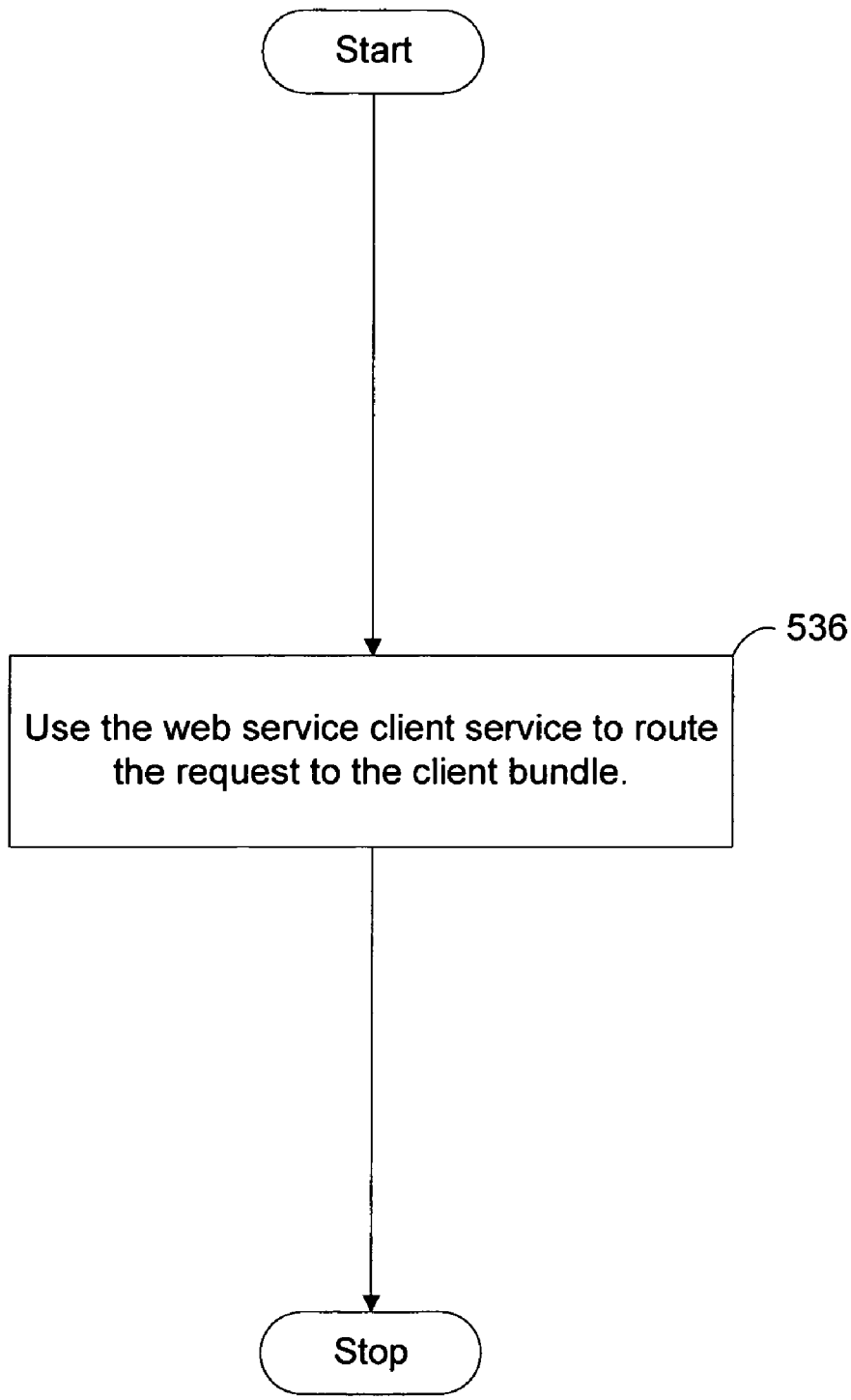
Figure 5H:
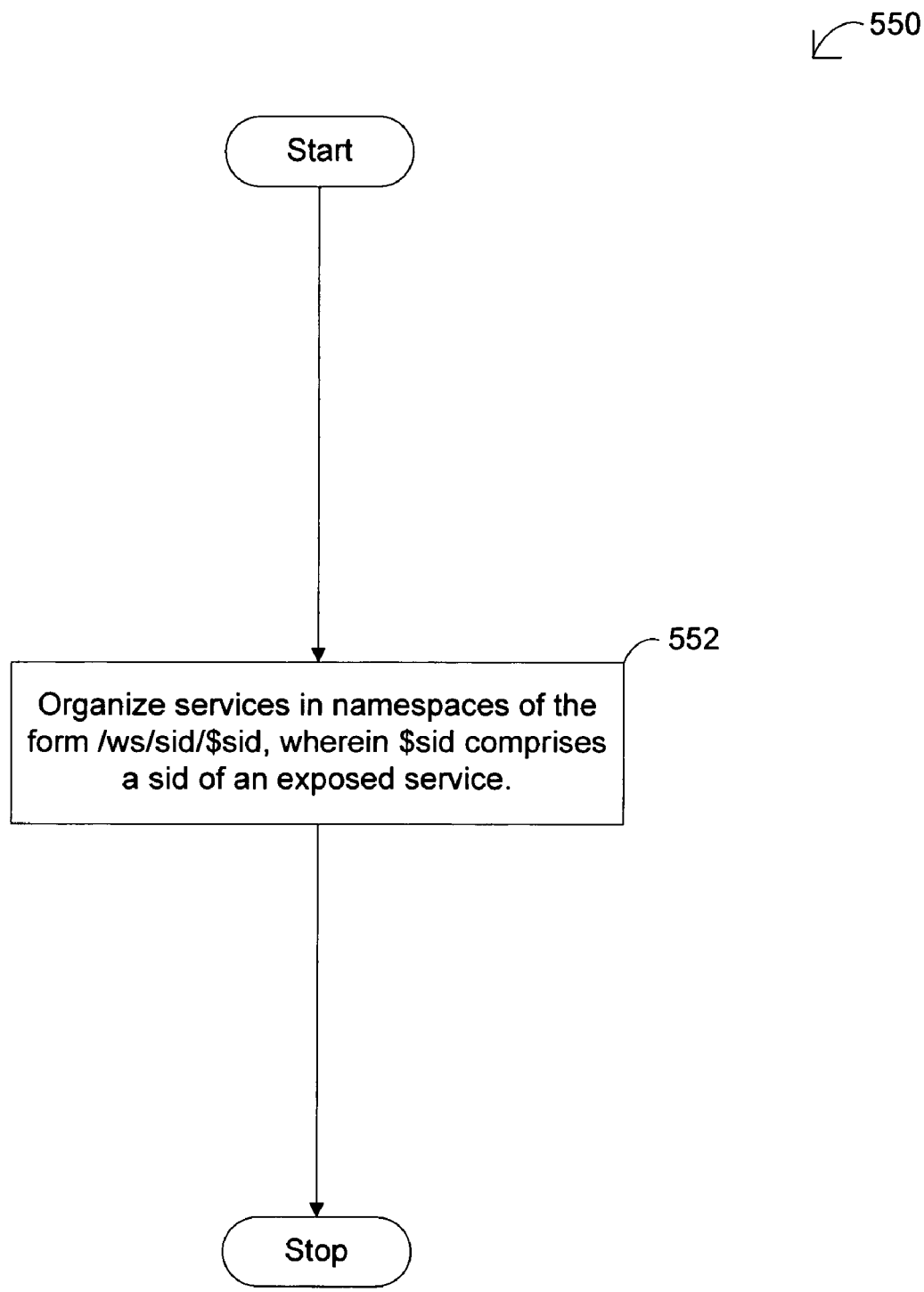
Figure 5I:
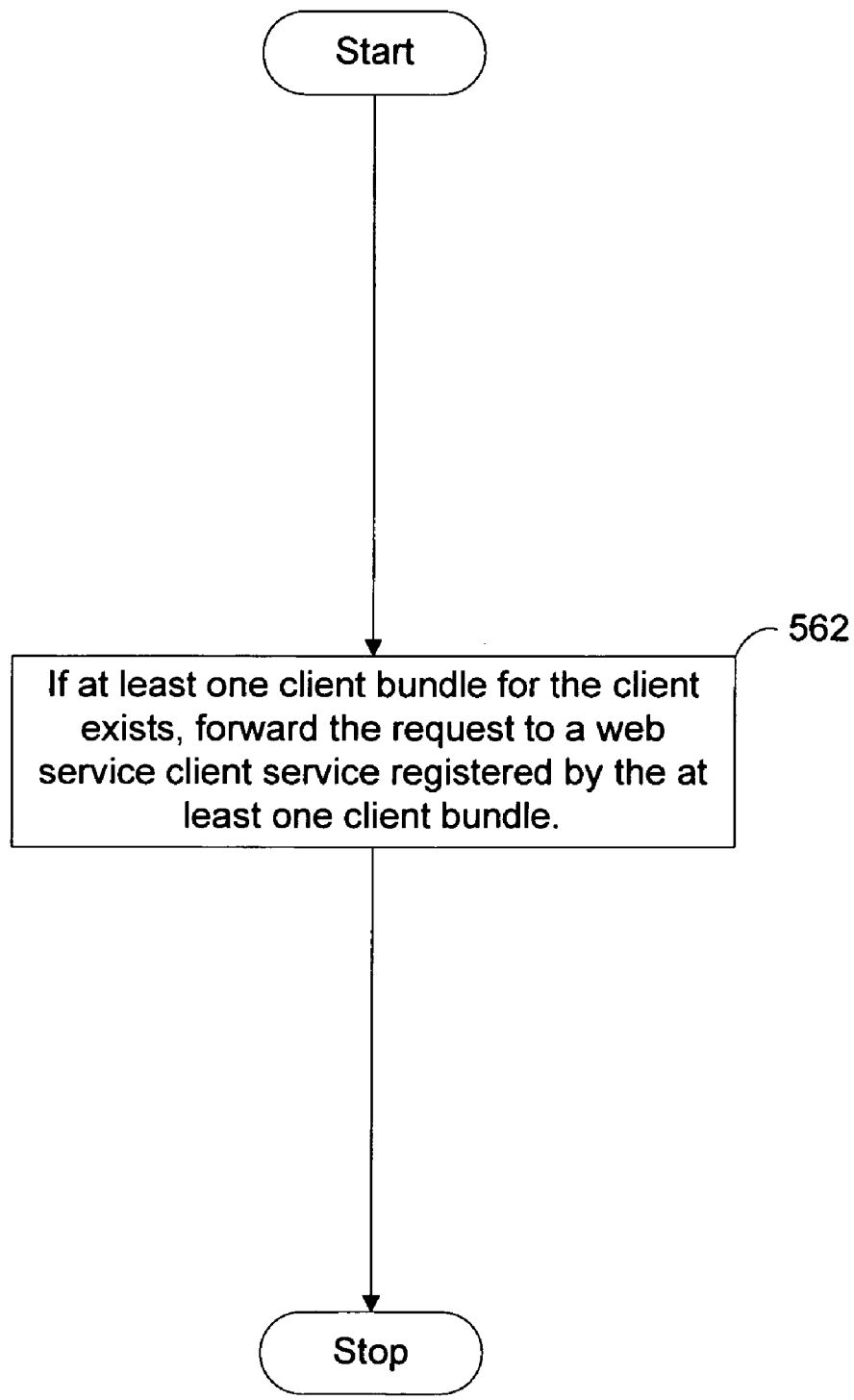
Figure 5J:
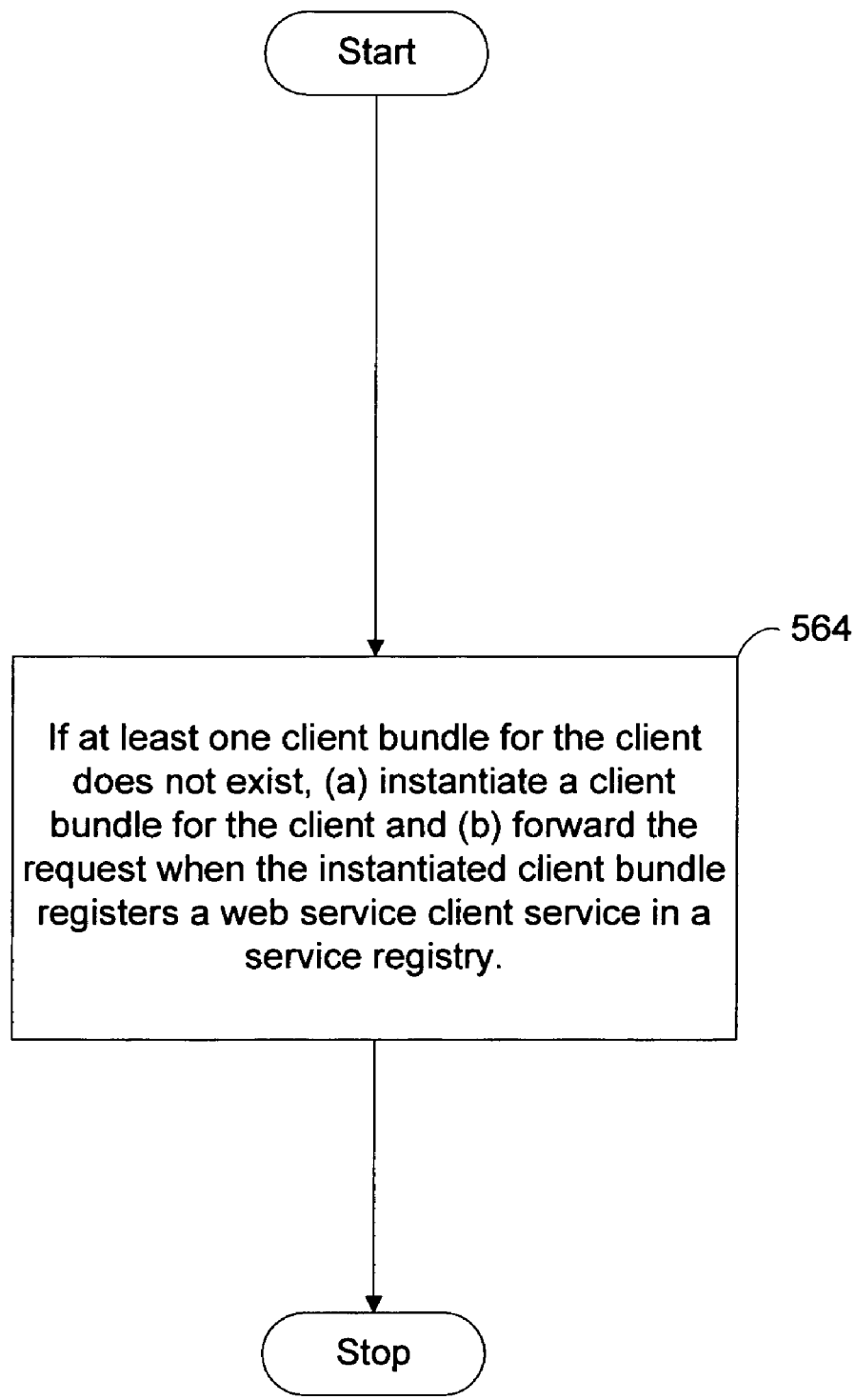
Figure 5K:
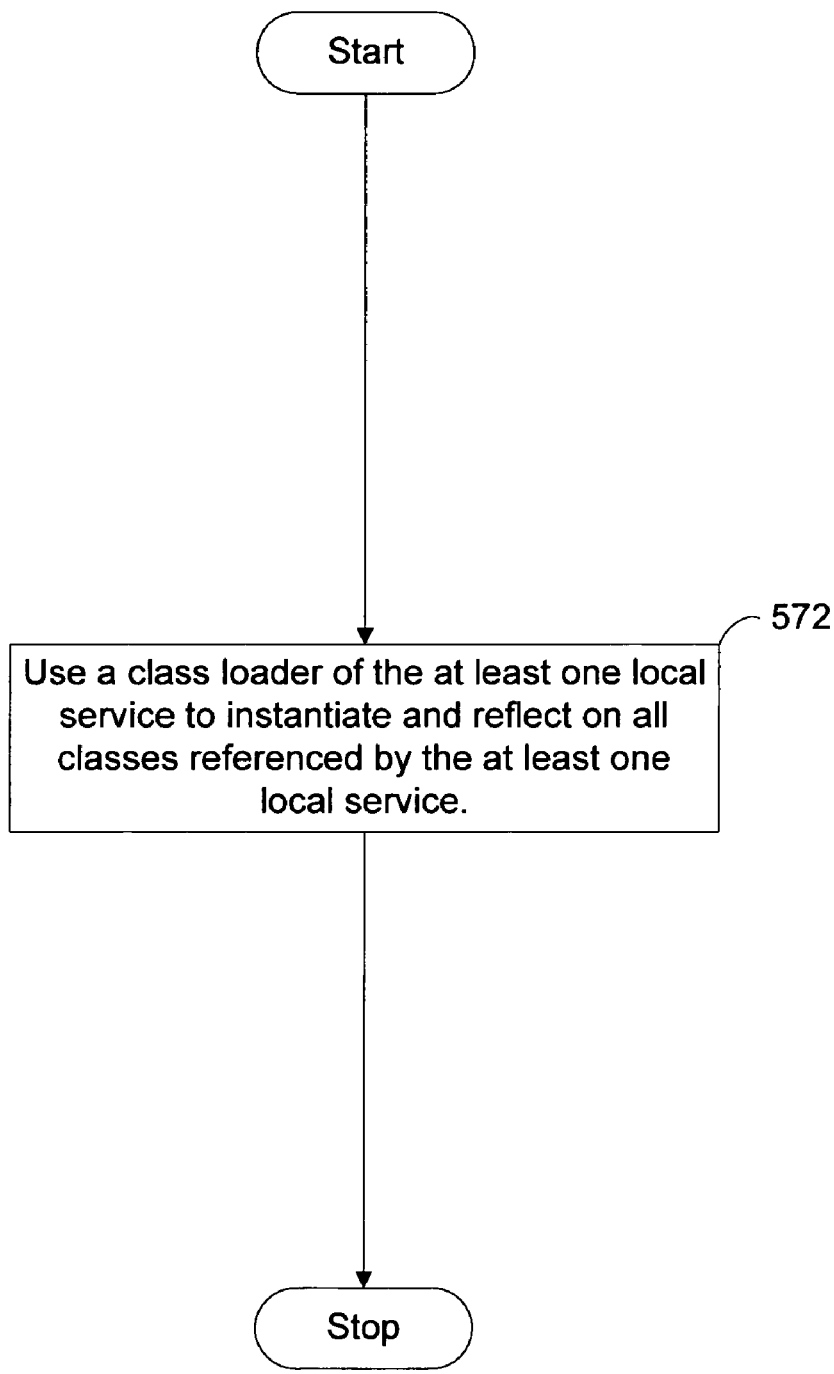
Figure 5L:
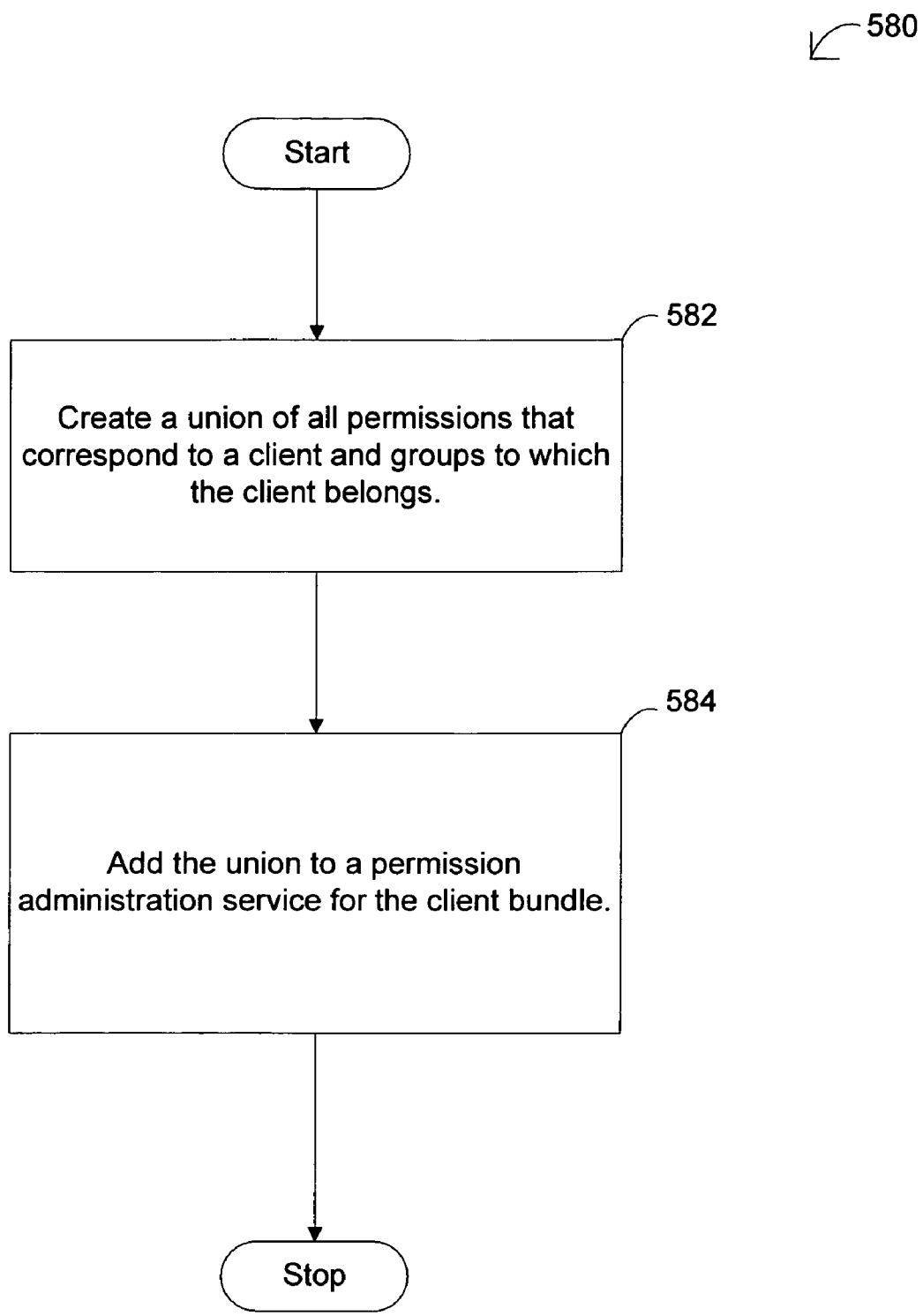

FIG. 1 is a block diagram of a prior art technique.
FIG. 2 is a block diagram in accordance with an exemplary embodiment of the present invention.
FIG. 3A is a flowchart in accordance with an exemplary embodiment of the present invention.
FIG. 3B is a flowchart in accordance with an exemplary embodiment of the present invention.
FIG. 3C is a flowchart in accordance with an exemplary embodiment of the present invention.
FIG. 3D is a flowchart in accordance with an exemplary embodiment of the present invention.
FIG. 3E is a flowchart in accordance with an exemplary embodiment of the present invention.
FIG. 3F is a flowchart in accordance with an exemplary embodiment of the present invention.
FIG. 4 is a block diagram in accordance with an exemplary embodiment of the present invention.
FIG. 5A is a flowchart in accordance with an exemplary embodiment of the present invention.
FIG. 5B is a flowchart in accordance with an exemplary embodiment of the present invention.
FIG. 5C is a flowchart in accordance with an exemplary embodiment of the present invention.
FIG. 5D is a flowchart in accordance with an exemplary embodiment of the present invention.
FIG. 5E is a flowchart in accordance with an exemplary embodiment of the present invention.
FIG. 5F is a flowchart in accordance with an exemplary embodiment of the present invention.
FIG. 5G is a flowchart in accordance with an exemplary embodiment of the present invention.
FIG. 5H is a flowchart in accordance with an exemplary embodiment of the present invention.
FIG. 5I is a flowchart in accordance with an exemplary embodiment of the present invention.
FIG. 5J is a flowchart in accordance with an exemplary embodiment of the present invention.
FIG. 5K is a flowchart in accordance with an exemplary embodiment of the present invention.
FIG. 5L is a flowchart in accordance with an exemplary embodiment of the present invention.

DETAILED DESCRIPTION OF THE INVENTION

The present invention provides a method and system of mapping at least one web service to at least one OSGi service and exposing at least one local service as at least one web service.

Mapping Web Services to OSGi

The present invention provides a method and system of mapping at least one web service to at least one OSGi service. In an exemplary embodiment, the method and system of mapping at least one web service to at least one OSGi service include (1) creating a proxy bundle corresponding to the at least one web service, (2) registering a proxy web service corresponding to the proxy bundle in a service registry, (3) searching for the at least one web service in the service registry, (4) returning a reference to the proxy web service from the service registry in response to the searching, and (5) invoking at least one method on the returned reference, thereby invoking the at least one web service.

In an exemplary embodiment, the present invention maps web services to OSGi by conforming to JAX-RPC (1) to create a dynamic proxy and (2) to register it in the service registry, such as service registry 120. In an exemplary embodiment, the present invention uses proxy bundles so that (a) a single bundle does not register all of the web services and (b) the present invention keeps track of and manages web services that are desired to be in the service registry.

Referring to FIG. 2, in an exemplary embodiment, the present invention includes the steps of registering, finding, and using a web service 235 by a normal OSGi bundle, bundle 112, through service registry 120. A proxy bundle 210 is created dynamically when a web service 235 is registered by a local web service manager 225. The first step, retrieval of the WSDL, via a retrieve WSDL 240, happens during the creation of proxy bundle 210 via a create 241. The second step, registration of the web service proxy, proxy service 230, via a registration 242, happens when proxy bundle 210 is started. The remaining steps occur when bundle 112 uses service 130. There is also a step of forwarding method invocations to a remote web service provider 220, via an invoke method 146 and an invoke 244.

Referring to FIG. 3A, in an exemplary embodiment, the present invention includes a step 310 of creating a proxy bundle corresponding to the at least one web service, a step 312 of registering a proxy web service, such as proxy service 230, corresponding to the proxy bundle in a service registry, a step 314 of searching for the at least one web service in the service registry, a step 316 of returning a reference to the proxy web service from the service registry in response to the searching, and a step 318 of invoking at least one method on the returned reference, thereby invoking the at least one web service.

Referring to FIG. 3B, in an exemplary embodiment, creating step 310 includes a step 322 of retrieving WSDL of the at least one web service and a step 324 of parsing the retrieved WSDL to get a list of packages used by the at least one web service. In a further embodiment, as shown in FIG. 3C, creating step 310 includes a step 332 of saving the retrieved WSDL in a JAR file. In a particular embodiment, as shown in FIG. 3D, saving step 332 includes a step 342 of storing the list of packages in a bundle manifest corresponding to the proxy bundle. Referring to FIG. 3E, n a further embodiment, creating step 310 includes a step 352 of optimally generating class files that correspond to the WSDL rather than using existing class files. Referring to FIG. 3F, In an exemplary embodiment, registering step 312 includes a step 362 of using a list of properties from the proxy bundle as service properties.

Proxying Web Services

In order to expose a proxied implementation of this interface to other bundles through service registry 120, in an exemplary embodiment, the present invention imports the package of the interface. In an exemplary embodiment, in order to isolate the import problems, the present invention registers proxy services, such as proxy service 230, in their own proxy bundle, such as proxy bundle 210.

Creating a Proxy Bundle

In an exemplary embodiment, the present invention creates proxy bundle 210 by retrieving and parsing the WSDL to get a list of the packages used by the service via retrieve WSDL 240. The WSDL is then saved in a newly created JAR file. The JAR file's manifest includes the list of used packages in the import section and includes a standard proxy activator. In an exemplary embodiment, the present invention also adds a list of properties that will be registered with the service in service registry 120.

In theory, it is not necessary to parse the WSDL to get a list of packages used by web service 235 since the present invention could use the dynamic package feature discussed earlier. In an exemplary embodiment, when proxy bundle 210 is started and the needed packages aren't being exported, proxy bundle 210 will generate a runtime error that will generally require administrator involvement to resolve. By listing the needed packages in the bundle manifest, the same situation would mark proxy bundle 210 as unresolved. This not only avoids the runtime error, but it also enables programmatic resolution of the error. In other words, a management bundle could get the list of packages needed by proxy bundle 210 and install bundles that provide those packages.

Invoking the Web Service

In an exemplary embodiment, the start( ) method of the proxy bundle's activator reparses the WSDL to get the information needed to invoke web service 235. When the activator registers a proxy of web service 235, such as proxy service 230, in service registry 120, it uses the list of properties from proxy bundle 210 as the service properties. The service properties also includes the URLs of the WSDL and the service endpoint. For bundles that use the proxied services as normal OSGi services, the URLs are just ignored. However, for bundles that are web service aware, the URLs give them extra information that they can use to distinguish services.

When the Web Service Provider Fails

In an exemplary embodiment, if web service provider 220 fails (e.g. goes down), there is a natural mapping to normal OSGi service behavior (i.e. web service 235 is unregistered). Bundles must be able to deal with services coming and going, so it is natural to see a service go away. Once web service provider 220 comes back up, the proxy bundle can re-register web service 235. Interested bundles will be notified of the registration and will resume their use of web service 235.

Decoupling Proxy Bundles

In an exemplary embodiment, the structure of proxy bundles allows them to be decoupled from the framework on which they were created. In other words, proxy bundles can be installed on any framework with the web service runtime. Therefore, web service registration can be managed with the same tools used to manage normal bundles, such as bundle 112.

Building Proxy Bundles

In an exemplary embodiment, when building a proxy bundle, such as proxy bundle 210, the present invention can optimally generate class files that correspond to the WSDL rather than using existing class files. The present invention can do this in an extremely small footprint, without using a compiler, since the classes will be an interface or a simple bean like class. Therefore, the present invention can generate classes even on devices with limited resources.

Exposing Local Services

The present invention also provides a method and system of exposing at least one local service as at least one web service. In an exemplary embodiment, the present invention exposes local services as web services by extending the concept of the proxy bundle, such as proxy bundle 210, to the client proxy bundle (hereinafter "client bundle"). In an exemplary embodiment, each client of an exposed service is represented by a client bundle.

In an exemplary embodiment, the method and system include (1) receiving a call for the at least one web service, (2) delegating the call to a local bundle, (3) obtaining the at least one local service from a service registry via the local bundle, (4) invoking at least one method on the at least one local service via the local bundle, and (5) returning a response from the invoked method for the at least one web service.

FIG. 4, in an exemplary embodiment, shows a high level view of how a local service is exposed as a web service. First, bundle 110 need not know that its service 130 is being exposed as a web service. Second, nothing happens until a web service client 420 connects to a client bundle 412 via a connection manager 425. When web service client 420 makes a request via a connect and authenticate 440 using standard web service invocations, client bundle 412 will be created to represent the client if one is not present already. Finally, all interactions by web service client 420 will be done through client bundle 412, thereby exposing permissions and other information through client bundle 412.

The client connects to connection manager 425 via connect and authenticate 440. Since all web services share the same address and port number, connection manager 425 accepts connections from web service clients, such as web service client 420, authenticates them, and routes them to the correct client bundle, such as client bundle 412, via instantiating client bundles if necessary, via create bundle and route connection 442.

Once a web service request has been received from connection manager 425, client bundle 412 finds the service, service 130, in service registry 120, retrieves service 130 via return 144, deserializes the parameters of the request into Java objects via a use service 130 as web service 444, and uses reflection to invoke service 130. When the invocation, invoke method 146, returns, the return values are serialized into a response message and sent back to the client via use service 130 as web service 444.

Referring to FIG. 5A, in an exemplary embodiment, the present invention includes a step 510 of receiving a call for the at least one web service, where the call comprises a request and a response, a step 512 of delegating the call to a client bundle, a step 514 of obtaining the at least one local service from a service registry via the client bundle, a step 516 of invoking at least one method on the at least one local service via the client bundle, and a step 518 of returning a response from the invoked method for the at least one web service.

Referring to FIG. 5B, in an exemplary embodiment, receiving step 510 includes a step 522 of identifying a client that sent the call and a step 524 of checking if at least one client bundle for the client exists. In a particular embodiment, as shown in FIG. 5C, identifying step includes a step 526 of using HTTP basic authentication.

Referring to FIG. 5D, in an exemplary embodiment, delegating step 512 includes a step 532 of creating a client bundle that is not persistent and that does not register services for other bundles to use. Referring to FIG. 5E, in an exemplary embodiment, delegating step 532 includes a step 542 of identifying a client that sent the call by a user id that the client is using to make the request. Referring to FIG. 5F, in an exemplary embodiment, creating step 532 includes a step 534 of registering a web service client service in a service registry. In a particular embodiment, as shown in FIG. 5G, registering step 534 includes a step 536 of using the web service client service to route the request to the client bundle.

Referring to FIG. 5H, in an exemplary embodiment, obtaining step 514 includes as step 552 of organizing services in namespaces of the form /ws/sid/$sid, wherein $sid comprises a sid of an exposed service. Referring to FIG. 5I, in an exemplary embodiment, delegating step 512 includes as step 562 of, if at least one client bundle for the client exists, forwarding the request to a web service client service registered by the at least one client bundle. Referring to FIG. 5J, in an exemplary embodiment, delegating step 512 includes a step 564 of, if at least one client bundle for the client does not exist, (a) instantiating a client bundle for the client and (b) forwarding the request when the instantiated client bundle registers a web service client service in a service registry.

Referring to FIG. 5K, in an exemplary embodiment, invoking step 516 includes a step 572 of using a class loader of the at least one local service to instantiate and reflect on all classes referenced by the at least one local service. Referring to FIG. 5L, in an exemplary embodiment, creating step 532 includes a step 582 of creating a union of all permissions that correspond to a client and groups to which the client belongs and a step 584 of adding the union to a permission administration service for the client bundle.

Client Bundle

In an exemplary embodiment, in contrast to proxy bundles, client bundles only use services. In other words, client bundles do not register services. In addition, while proxy bundles are persistent, client bundles represent a non persistent session with a client. Therefore, in an exemplary embodiment, if the framework is restarted, the present invention deletes the client bundles. Delegation 512 further creates a client bundle that is not persistent and does not register services for other bundles to use.

Identifying a Client

In an exemplary embodiment, a client is identified by the user id that the client is using to make requests. Other alternatives would be to use the client's IP address or, for even more granularity, a session id. In an alternative embodiment, the present invention uses the combination of user id and IP address to identify a client. It would be convenient to have a client bundle for each session, but it is not clear that most clients would be using sessions.

Manifest File

In an exemplary embodiment, the client bundle includes a manifest file and an activator. The manifest file includes an entry identifying the client represented by the bundle and an entry to specify the client bundle activator. In an exemplary embodiment, When the client bundle is started, the activator registers a web service client service, such as WebServiceClient service, in the service registry. In an exemplary embodiment, WebServiceClient service includes a single method, serviceRequest.

Requests from the Client

Requests from the client represented by a client bundle are handled by the serviceRequest method. This method deserializes the request into Java objects and uses reflection to invoke the local service, retrieving it from the service registry if needed. When the invocation returns, the return values are serialized into a response message and sent back to the client. In an exemplary embodiment, the present invention uses web service client 420 to route a request to client bundle 412.

Exposing a Service as a Web Service

In an exemplary embodiment, the present invention, in web service runtime, registers a web service provider service, such as WebServiceProvider, in the OSGi framework. This service takes a sid (service id), a unique id generated for each service when it is registered, or a pid (persistent id), an optional id that is included in the service's properties when the service is registered, to identify services to expose as web services.

In an exemplary embodiment, services that are exposed using pids will be persistently marked as exposed. In an exemplary embodiment, services exposed using sids will cease to be exposed once the service is unregistered. In an exemplary embodiment, the present invention, for a local bundle such as bundle 110, the present invention allows a service to be exposed as a web service by including a specific property in the service properties when registering the local bundle.

Organizing Services

In an exemplary embodiment, the present invention organizes services in namespaces of the form /ws/sid/$sid, where $sid is the sid of the exposed service. In an exemplary embodiment, for pids, the present invention organizes services in namespaces of the form /ws/pid/$pid. The present invention follows the standard form of other web service providers and returns the WSDL for a service if ?wsdl is added to the end of the URL for a service.

For example, if the web service runtime is running on a computer with an address of X on port 6777 and if a service with a sid of 34 gets exposed as a web service, (1) the URL to access its service endpoint would be X:6777/ws/sid/34 and (2) its WSDL would be found at X:6777/ws/sid/34?wsdl.

Web Service Endpoint

In an exemplary embodiment, when a web service client invokes a web service endpoint, the web service runtime gets the request and uses HTTP basic authentication to identify the client. The present invention then checks if there are any client bundles for the client making the request. If such a client bundle exists, runtime forwards the request to the web service client service, such as WebServiceClient service, registered by that client bundle. If there are no such client bundles, the runtime instantiates a client bundle for that client and forwards the request when the newly instantiated bundle registers the web service client service, such as WebServiceClient service.

Uninstalling Client Bundles

In an exemplary embodiment, just as the web service runtime instantiates client bundles, it uninstalls client bundles when the client is no longer using any web services. If a client does not use an OSGi service for a certain period of time, the client bundle will release the service. Once all the services used by a bundle have been released, the bundle is uninstalled.

Not Import Packages

In an exemplary embodiment, client bundles do not import packages. They can do without imports because they do all their work using reflection. When the client bundle retrieves a service from the service registry, it identifies the service using its class name, not its Class object. Thus, the service can be retrieved without actually importing any classes. Once the client bundle has the service object, it uses that objects class loader to instantiate and reflect on any other classes referenced by that service.

Dealing with Security

In an exemplary embodiment, the present invention ensures OSGi security when exposing web services. In an exemplary embodiment, the present invention authenticates the web service clients. In an exemplary embodiment, the present invention expresses the authorization information that corresponds to a client.

Authentication

In an exemplary embodiment, authentication is done in OSGi using a user manager service, such as UserManager service. The present invention authenticates a web service client by looking up the user id used by the client and matching it against the password stored in the private information for that user. If the password does not match, the present invention rejects the request as not authenticated. Otherwise, the present invention proceeds with the authorization phase of the security.

Authorization

In an exemplary embodiment, in order to participate transparently in the OSGi security model, the present invention maps the client to a set of permissions. This mapping is enabled by the use of the client bundle. Since each client is mapped to a unique client bundle, the present invention uses a permission administration service, such as PermissionAdmin service, of OSGi to map the set of permissions that correspond to a client to the correct client bundle.

In an exemplary embodiment, since the user manager service, such as UserManager service, allows for the storage of properties with each user and group, the present invention stores permissions in User Manager. The permissions that correspond to each user and group are preset, such as by an administrator. When a client bundle is being instantiated, the runtime creates a union of all the permissions that correspond to the user and the groups to which the user belongs, and adds that set of permissions to the permission administration service, such as PermissionAdmin service, for the new client bundle. After the permissions have been added, the client bundle will be installed and started with the correct set of permissions. When the client bundle is uninstalled the corresponding entry in permission administration service, such as PermissionAdmin service, is removed.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A computer system of exposing at least one local service as at least one web service, the computer system comprising:
  a receiver within the computer system configured to receive a call for the at least one web service, wherein the call comprises a request and a response and wherein receiving the call comprises:
  identifying a client that sent the call, wherein identifying includes using HyperText Transfer Protocol (HTTP) authentication; and
  checking if at least one client bundle for the client exists;
  a module processor coupled to the receiver within the computer system configured to-delegate the call to a client bundle, wherein delegating comprises:
  identifying the client by a user identification tag (user ID) used by the client that sent the call to make the request;
  creating the client bundle that is configured to be not persistent and to not register services for other bundles to use, wherein creating comprises, if at least one client bundle for the does not exist:
  instantiating a client bundle for the client;
  creating a union of all permissions that correspond to a client and groups to which the client belongs;
  adding the union to a permission administration service for the client bundle;
  registering a web service client service in a service registry, wherein registering comprises using the web service to forward the request to the client bundle; and
  forwarding the request to the web service client service registered by the client bundle;
  obtain the at least one local service from the service registry via the client bundle, wherein obtaining comprises organizing services in namespaces of a form/ws/sid/$sid, wherein $sid comprises an identification of an exposed service;
  an invoke at least one method on the at least one local service via the client bundle, wherein invoking comprises using a class loader of the at least one local service to instantiate and reflect on all classes referenced the at least one local service; and
  return a response from the invoked method for the at least one web service.

2. A processor-implemented method of exposing at least one local service as at least one web service via a computer system, the method comprising:
  receiving via the computer system a call for the at least one web service, wherein the call comprises a request and a response and wherein receiving the call comprises:

identifying a client that sent the call, wherein identifying includes using HyperText Transfer Protocol (HTTP) authentication; and
checking if at least one client bundle for the client exists;
delegating via the computer system the call to a client bundle, wherein delegating comprises:
    identifying the client by a user identification tag (user ID) used by the client that sent the call to make the request;
creating the client bundle that is configured to be not persistent and to not register services for other bundles to use, wherein creating comprises, if at least one client bundle for the does not exist:
    instantiating a client bundle for the client;
creating a union of all permissions that correspond to a client and groups to which the client belongs;
    adding the union to a permission administration service for the client bundle;
registering a web service client service in a service registry, wherein registering comprises using the web service to forward the request to the client bundle; and
forwarding the request to the web service client service registered by the client bundle;
obtaining via the computer system that at least one local service from the service registry via the client bundle, wherein obtaining comprises organizing services in namespaces of a form/ws/sid/$sid, wherein $sid comprises an identification of an exposed service;
invoking via the computer system at least one method on the at least one local service via the client bundle, wherein invoking comprises using a class loader of the at least one local service to instantiate and reflect on all classes referenced by the at least one local service; and
returning via the computer system a response from the invoked method for the at least one web service.

* * * * *